United States Patent
Polzounov et al.

(10) Patent No.: US 11,514,671 B2
(45) Date of Patent: Nov. 29, 2022

(54) SEMANTIC SEGMENTATION TO IDENTIFY AND TREAT PLANTS IN A FIELD AND VERIFY THE PLANT TREATMENTS

(71) Applicant: Blue River Technology Inc., Sunnyvale, CA (US)

(72) Inventors: Andrei Polzounov, San Francisco, CA (US); James Patrick Ostrowski, Mountain View, CA (US); Lee Kamp Redden, Palo Alto, CA (US); Olgert Denas, Sunnyvale, CA (US); Chia-Chun Fu, Sunnyvale, CA (US); Chris Padwick, Menlo Park, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 38 days.

(21) Appl. No.: 16/893,405

(22) Filed: Jun. 4, 2020

(65) Prior Publication Data
US 2020/0302170 A1 Sep. 24, 2020

Related U.S. Application Data

(63) Continuation of application No. 16/126,842, filed on Sep. 10, 2018, now Pat. No. 10,713,484.

(51) Int. Cl.
*G06V 20/10* (2022.01)
*G06N 5/04* (2006.01)
(Continued)

(52) U.S. Cl.
CPC ........... *G06V 20/188* (2022.01); *G06N 5/046* (2013.01); *G06T 7/10* (2017.01); *G06V 10/26* (2022.01);
(Continued)

(58) Field of Classification Search
CPC ........ G06N 3/08; G06N 3/0454; G06N 5/046; G06T 7/10; G06T 2207/20084; G06K 9/00657; G06K 9/34; A01B 76/00
See application file for complete search history.

(56) References Cited

U.S. PATENT DOCUMENTS

| 10,254,395 B2 | 4/2019 | Nichols et al. |
| 2015/0027043 A1 | 1/2015 | Redden |

(Continued)

FOREIGN PATENT DOCUMENTS

| CN | 106951836 B | * 12/2019 | ......... G06K 9/00657 |
| WO | WO 2017/178666 A1 | 10/2017 | |

(Continued)

OTHER PUBLICATIONS

Lguensat, R. et al., "EddyNet: A Deep Neural Network for Pixel-Wise Classification of Oceanic Eddies" Nov. 10, 2017, five pages.

(Continued)

*Primary Examiner* — Brenda C Bernardi
(74) *Attorney, Agent, or Firm* — Fenwick & West LLP

(57) ABSTRACT

A farming machine including a number of treatment mechanisms treats plants according to a treatment plan as the farming machine moves through the field. The control system of the farming machine executes a plant identification model configured to identify plants in the field for treatment. The control system generates a treatment map identifying which treatment mechanisms to actuate to treat the plants in the field. To generate a treatment map, the farming machine captures an image of plants, processes the image to identify plants, and generates a treatment map. The plant identification model can be a convolutional neural network having an input layer, an identification layer, and an output layer. The input layer has the dimensionality of the image, the identification layer has a greatly reduced dimen- (Continued)

sionality, and the output layer has the dimensionality of the treatment mechanisms.

20 Claims, 17 Drawing Sheets

Related U.S. Application Data

(60) Provisional application No. 62/676,259, filed on May 24, 2018.

(51) Int. Cl.
  *G06T 7/10* (2017.01)
  *G06V 10/26* (2022.01)
  *A01B 76/00* (2006.01)

(52) U.S. Cl.
  CPC ..... *A01B 76/00* (2013.01); *G06T 2207/20084* (2013.01)

(56) References Cited

U.S. PATENT DOCUMENTS

| | | | |
|---|---|---|---|
| 2017/0071188 A1* | 3/2017 | Rees | G06K 9/52 |
| 2018/0116094 A1 | 5/2018 | Redden | |
| 2018/0189954 A1 | 7/2018 | Albrecht et al. | |
| 2018/0330165 A1 | 11/2018 | Halligan et al. | |
| 2018/0330166 A1 | 11/2018 | Redden et al. | |
| 2019/0104722 A1* | 4/2019 | Slaughter | A01D 34/008 |

FOREIGN PATENT DOCUMENTS

| | | |
|---|---|---|
| WO | WO 2017/181127 A1 | 10/2017 |
| WO | WO 2018/220528 A1 | 12/2018 |

OTHER PUBLICATIONS

Fawakherji, A. et al., "Crop and Weeds Classification for Precision Agriculture using Context-Independent Pixel-Wise Segmentation," IEEE, Feb. 2019, pp. 1-7.
Milioto, A. et al. "Real-time Semantic Segmentation of Crop and Weed for Precision Agriculture Robots Leveraging Background Knowledge in CNNs," IEEE International Conference on Robots and Automation, Mar. 2, 2018, pp. 1-7.
PCT International Search Report and Written Opinion, PCT Application No. PCT/US19/33699, dated Aug. 16, 2019, 14 pages.
European Patent Office, European Supplementary Search Report, EP Patent Application No. 19806864.5, dated Apr. 28, 2021, three pages.
Sa, I. et al., "weedNet: Dense Semantic Weed Classification Using Multispectral Images and MAV for Smart Farming," IEEE Robotics and Automation Letters, vol. 3, No. 1, Jan. 2018, pp. 588-595.

* cited by examiner

Treatment Element 320

Treatment Array 310

Treatment Element 320

Treatment Array 310

Treatment Element 320

Treatment Array 310

Executed Treatment Map
512

Executed Treatment Map
512

Executed Treatment Map
512

Executed Treatment Map
512

SEMANTIC SEGMENTATION TO IDENTIFY AND TREAT PLANTS IN A FIELD AND VERIFY THE PLANT TREATMENTS

CROSS-REFERENCE TO RELATED APPLICATIONS

This application is a continuation of U.S. application Ser. No. 16/126,842, filed Sep. 10, 2018 which claims the benefit of U.S. Provisional Application No. 62/676,259, filed May 24, 2018 which is incorporated herein by reference in its entirety for all purposes.

BACKGROUND

Field of Disclosure

This disclosure relates to using a plant identification model to identify and treat plants in a field and, more specifically, using a semantic segmentation model to identify and treat plants in a field.

Description of the Related Art

Historically, farming machines that spray crops with treatment fluid have relied on highly non-specific spray techniques such as broadcast spraying. Non-specific spray techniques are inefficient, wasteful, and can be harmful to field health. More recently, non-specific spraying has been supplemented with target-specific spray techniques that utilize detection devices to determine plants in the field. However, even these improved spray techniques can be wasteful because their algorithms often sacrifice accuracy, specificity, and resolution to identify plants quickly. Accordingly, a farming machine used for targeted spraying that uses an algorithm to rapidly identify plants without sacrificing accuracy, specificity, and resolution would be beneficial.

SUMMARY

A farming machine can include any number of treatment mechanisms to treat plants according to a treatment plan as the farming machine moves through the field. A treatment plan identifies which plants in a field to treat and how to treat them. Each treatment mechanism can controlled by a control system that actuates the treatment mechanisms at the appropriate time to treat plants as the farming machine moves through the field. The farming machine can also include multiple detection and verification systems to capture images of plants in the field to facilitate treating plants according to the treatment plan.

The control system of the farming machine can execute a plant identification model configured to identify plants in the field for treatment according to the treatment plan. The control system can generate a treatment map using the plant identification model. The treatment map is a data structure that includes information regarding which treatment mechanisms to actuate such that the treatment mechanisms treat identified plants according to the treatment plan.

To generate a treatment map, the farming machine captures an image of plants in the field with a detection system. The control system accesses the image and inputs the image to the plant identification model. The plant identification model processes the image to identify plants in the image according to the treatment plan. The plant identification model generates a treatment map that maps treatment areas of the treatment mechanisms to areas in the image including identified plants. The control system converts the treatment map into control signals for the treatment mechanisms and actuates the treatment mechanisms at the appropriate time such that the identified plants are treated according to the treatment plan.

The plant identification model can be a convolutional neural network including any number of nodes organized in any number of layers. In one example, the plant identification model executes a pixelwise semantic segmentation ("semantic segmentation") model on the neural network to identify plants in accessed images and generate treatment maps. In this case, the plant identification model includes an input layer, an identification layer, and an output layer. Each layer can be connected by any number of additional hidden layers.

The plant identification model inputs the accessed image at the input layer. Generally the input layer has a dimensionality similar to the dimensionality of the accessed image. The plant identification model reduces the dimensionality of the image using any number of functions. The functions can have any number of weights and parameters and act to identify latent information in the accessed image that represent plants. The functions reduce the accessed image to the identification layer. The identification layer is a data structure that represents the types and characteristics of objects identified by the functions of the plant semantic segmentation model.

The plant identification model outputs a treatment map at the output layer. Generally, the output layer has a dimensionality similar to the dimensionality of the plant treatment mechanisms of the farming machine. Again, the plant identification model can use any number of functions, weights, and hidden layers to increase the dimensionality from the identification layer to the output layer and generate a treatment map.

In various configurations, the identification layer can be used to identify any number of objects and conditions other than plants, such as: the result of a plant treatment, different types of plants, the condition of a plant, soil, weather, etc. Therefore, the plant identification model can be used to execute treatment plans using any of the identified objects. For example, in one configuration, the plant identification model can be configured to identify the result of previous plant treatments. As such, generated treatment map can be used to verify previously executed plant treatments.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIGS. 1A and 1B are side and front views of a system for applying a treatment fluid to plants in a field, according to one example embodiment.

DETAILED DESCRIPTION

I. Introduction

Farming machines that treat plants in a field have continued to improve over time. For example, a crop sprayer can include a large number of independently actuated spray nozzles to spray treatment fluid on specific plants in a field. The farming can further include any number of detection mechanisms that can detect plants in the field and any treatments made to plants in that field. Recently, farming machines have included control systems executing algorithms to automatically detect and treat plants using the detection mechanisms. Traditionally, the algorithms are wasteful in that they treat areas in the field that do not include identified plants because, often, the algorithms sacrifice accuracy for processing speed.

Described herein is a farming machine that employs a semantic segmentation model that automatically determines, in real-time, plants in a field and treats the identified plants using a treatment mechanism. The semantic segmentation model encodes an image of the field to a convolutional neural network trained to reduce the encoded image and identify plants in the field. Rather than decoding the identified plants back to an image, the semantic segmentation model decodes the identified plants to a treatment map which the farming machine uses to treat the plants in the field. The dimensionality of the treatment map is, generally, much less than the dimensionality of the image and, therefore, the processing time is reduced. The semantic segmentation model has higher accuracy, specificity, and provides better resolution for the treatment mechanisms than other traditional plant identification models.

II. Plant Treatment System

Figure 1A:
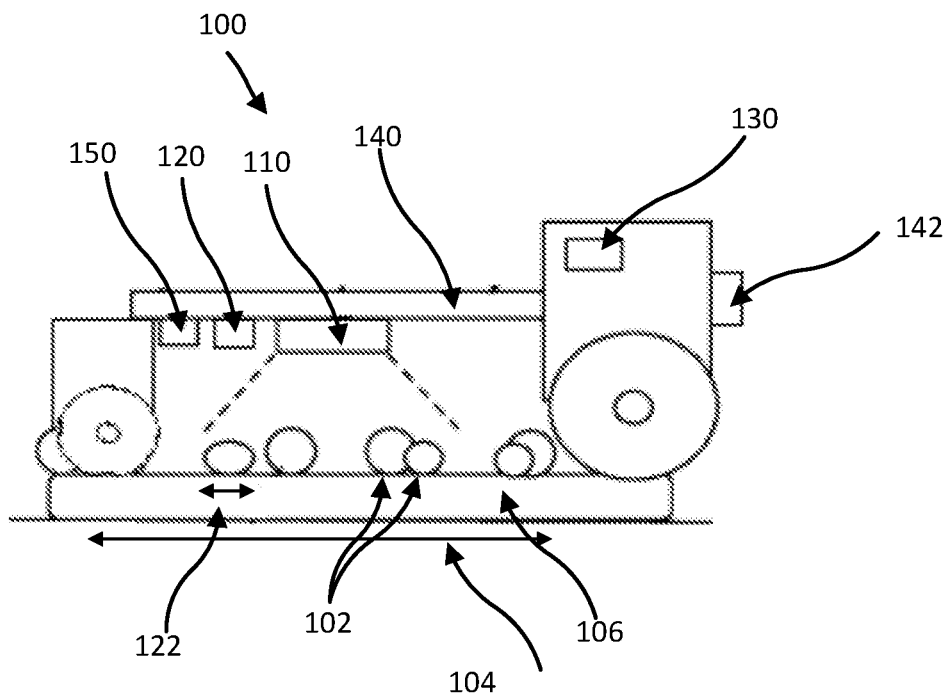
Figure 1B:
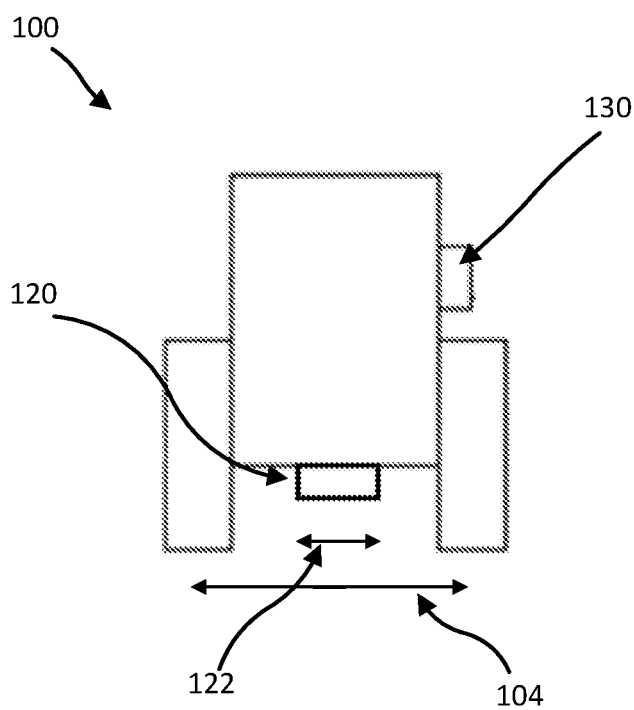

FIG. 1A is a side view illustration of a system for applying a treatment fluid to plants in a field and FIG. 1B is a front view illustration of the same system. The farming machine 100 for plant treatment includes a detection mechanism 110, a treatment mechanism 120, and a control system 130. The farming machine 100 can additionally include a mounting mechanism 140, a verification mechanism 150, a power source, digital memory, communication apparatus, or any other suitable component.

The farming machine 100 functions to apply a treatment to one or multiple plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant 102 growth can include promoting plant growth, promoting growth of a plant portion, hindering (e.g., retarding) plant or plant portion growth, or otherwise controlling plant growth. Examples of regulating plant 102 growth includes applying growth hormone to the plant, applying fertilizer to the plant or substrate 106, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The treatment mechanism 120 of the farming machine 100 functions to apply a treatment to the identified plant 102. The treatment mechanism 120 includes a treatment area 122 to which the treatment mechanism 120 applies the treatment. The effect of the treatment can include plant necrosis, plant growth stimulation, plant portion necrosis or removal, plant portion growth stimulation, or any other suitable treatment effect. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 can include a single treatment mechanism 120, or can include multiple treatment mechanisms. The multiple treatment mechanisms can be the same type of treatment mechanism, or be different types of treatment mechanisms. The treatment mechanism 120 can be fixed (e.g., statically coupled) to the mounting mechanism 140 or relative to the detection mechanism 110, or actuate relative to the mounting mechanism 140 or detection mechanism 110. For example, the treatment mechanism 120 can rotate or translate relative to the detection mechanism 110 and/or mounting mechanism 140. In one variation, the farming machine 100 includes an assembly of treatment mechanisms, wherein a treatment mechanism 120 (or subcomponent of the treatment mechanism 120) of the assembly is selected to apply the treatment to the identified plant 120 or portion of a plant in response to identification of the plant and the plant position relative to the assembly. In a second variation, the farming machine 100 includes a single treatment mechanism, wherein the treatment mechanism is actuated or the farming machine 100 moved to align the treatment mechanism 120 active area 122 with the targeted plant 102. In a third variation, the farming machine 100 includes an array of treatment mechanisms 120, wherein the treatment mechanisms 120 are actuated or the farming machine 100 is moved to align the treatment mechanism 120 active areas 122 with the targeted plant 102 or plant segment.

In one example configuration, the farming machine 100 can additionally include a mounting mechanism 140 that functions to provide a mounting point for the system components. In one example, as shown in FIG. 1A, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the farming machine 100.

In one example farming machine 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but alternatively the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some example systems, the detection mechanism 110 can be mounted to the mounting mechanism 140, such that the detection mechanism 110 traverses over a geographic location before the treatment mechanism 120 traverses over the geographic location. In one variation of the farming machine 100, the detection mechanism 110 is statically mounted to the mounting mechanism 140 proximal the treatment mechanism 120. In variants including a verification mechanism 150, the verification mechanism 150 is arranged distal the detection mechanism 110, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other systems, the detection mechanism 110 can be incorporated into any other component of the farming machine 100.

In some configurations, the farming machine 100 can additionally include a verification mechanism 150 that functions to record a measurement of the ambient environment of the farming machine 100, which is used to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or be different from the detection mechanism 110. The verification mechanism 150 can be a multispectral camera, a stereo camera, a CCD camera, a single lens camera, hyperspectral imaging system, LIDAR system (light detection and ranging system), dyanmometer, IR camera, thermal camera, humidity sensor, light sensor, temperature sensor, or any other suitable sensor. In other configurations of the farming machine 100, the verification mechanism 150 can be included in other components of the system.

In some configurations, the farming machine 100 can additionally include a power source, which functions to power the system components, including the detection mechanism 100, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 can additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

III. Generating a Treatment Map

A farming machine 100 can operate in a field according to a treatment plan. A treatment plan determines which identified objects in the field are treated by the treatment mechanisms 120 of the farming machine 100. For example, a treatment plan can indicate the farming machine to treat weeds with herbicides, plants with growth promoters, soil with fungicides, etc. Whatever the treatment plan, as the farming machine 100 travels through the field, the detection mechanism 110 identifies the objects and treatment mechanisms 120 treats the objects.

In some cases, a farming machine 100 generates a treatment map to facilitate treating identified objects in the field. Broadly, a treatment map is a data structure including information which represents which treatment mechanisms 120 of a farming machine are actuated to appropriately treat plants in a field according to a treatment plan as the farming machine is travelling through the field. However, rapidly and accurately generating a treatment map while a farming machine 100 travels through the field is a challenging problem. For context, successfully treating a plant requires a farming machine 100 to acquire an image with a detection mechanism 110, access the image, process the image to identify plants according to a treatment plan, generate a treatment map based on the identified plants, and treat the plants based on the treatment map by actuating appropriate plant treatment mechanisms as they pass above the identified plants. Executing all of these steps in the amount of time it takes for the farming machine 100 to travel past an identified plant in a field is non-trivial. In particular, processing images to quickly and precisely identify plants and generate a treatment map according to a treatment plan is especially challenging.

Generating a treatment map relies on a system controller 130 accessing an image of the field, identifying plants in the accessed image, and mapping the identified plants to treatment mechanisms 120 of the farming machine for treatment. This section describes generating a treatment map by accessing an image and mapping treatment mechanisms to the accessed image. The subsequent two sections describe identifying objects in an accessed image and how that information can be used to generate a treatment map.

III.A Accessed Images

A farming machine 100 obtains images of a field using a detection mechanism 110 as the farming machine 100 travels through the field and, generally, the obtained images include the treatment areas 122 of the treatment mechanisms 120. Each obtained image also includes information that represents various features and objects in the field. For example, an image can include information representing a plant, a plant treatment, soil, field conditions, etc. The information can include color, shapes, sizes, metadata of the image, detection mechanisms characteristics, pixel information, etc. The control system 130 of the farming machine 100 can access and process the image to determine the features and objects in the field using the information included in the image. Based on the determined features and objects, the farming machine 100 can execute various actions as described herein.

Figure 2:
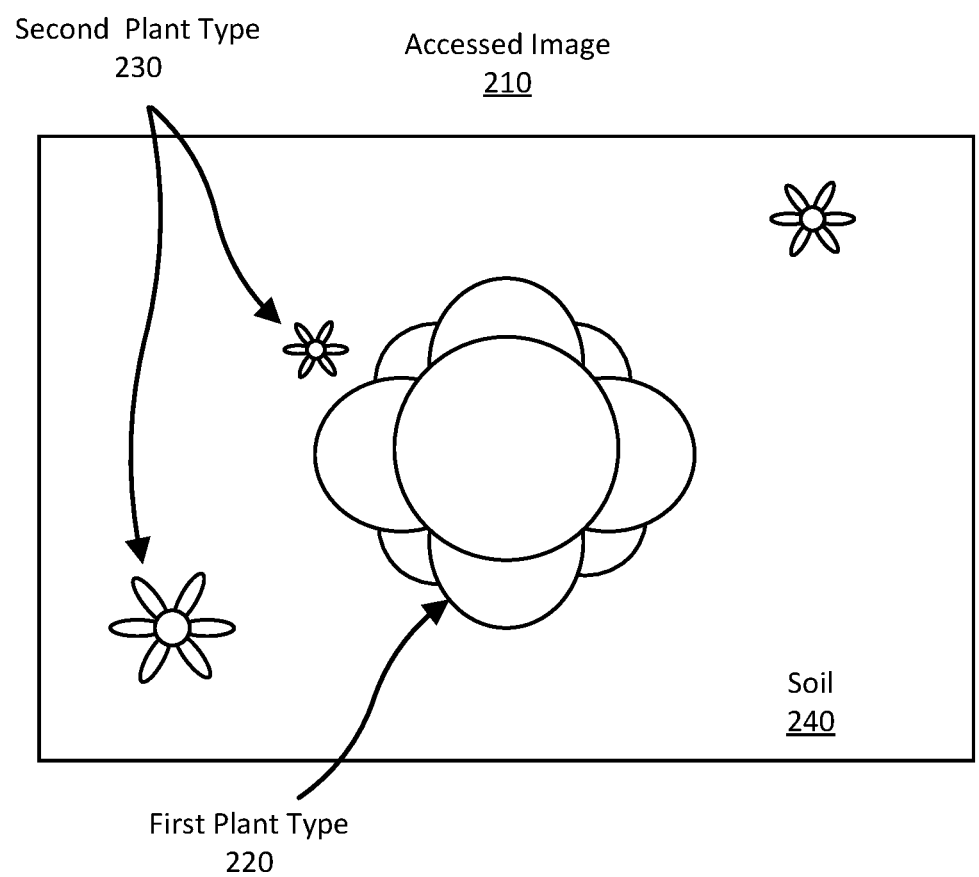
FIG. 2 is an illustration of an image accessed by the control system, according to one example embodiment.

FIG. 2 is an illustration of an image accessed by the control system (i.e., accessed image 210). The accessed image 210 is obtained by a detection mechanism 110 coupled to a farming machine 100 as the farming machine 100 travels through a field. The accessed image 210 includes information representing a single plant of a first type 220, three plants a second type 230 that are different sizes, and soil 240 in the field.

The accessed image 210 has a pixel dimensionality. The pixel dimensionality is the number of pixels in the accessed image (e.g., 512 pixels×1024 pixels, etc.). In some cases, the control system 130 can adjust the image to change the pixel dimensionality or information in the image. For example, the control system 130 can change the pixel dimensionality by cropping, up-sampling, down-sampling, etc. as desired. Each pixel in the accessed image 210 represents an area of the field. The amount of area of the field that each pixel represents can depend on the characteristics of the detection mechanism 110 (e.g., distance from the camera to the field, focal length, etc.). For example, each pixel in an accessed image can represent a 1 mm×1 mm area of the field. Still further, groups of pixels in the accessed image can correspond to a treatment area 122 of a treatment mechanism 120. For example, if each pixel represents a 1 mm×1 mm area and a treatment area 122 for a treatment mechanism is 1 cm×5 cm, the treatment area 122 can represent by 10 pixels×50 pixels. That is, a group of pixels has a density (e.g., pixels/cm) that relates an area (e.g., pixels$^2$) in an accessed image 210 to the treatment area 122 (e.g., cm$^2$) in the field. In some cases, the control system 130 stores information the amount of area of the field is associated with each pixel. In other examples, the control system 130 may store information regarding the configuration of the detection mechanism 110 and farming machine 100 such that the control system can determine the amount of area associated with each pixel.

III.B Treatment Arrays

Each farming machine 100 includes an array of treatment mechanisms 120. The system controller 130 can represent the treatment mechanisms 120 of the farming machine 100 as a treatment array. The treatment array is a data structure that includes a number of treatment elements with each treatment element of the treatment array corresponding to a treatment mechanism 120 of the array of treatment mechanisms. Each treatment element, and the treatment array, are a representation of the number, orientation, size, configuration, etc. (hereinafter "dimensionality," in aggregate) of the treatment mechanisms 120 of the farming machine 100. As such, a treatment array can be used by the control system 130 when identifying and treating objects in the field because each element of the treatment array has a real-world treatment mechanism 120 counterpart. As a contextual example, a farming machine 100 includes treatment mechanisms 120 that are a single row of 30 adjacent spray nozzles. Therefore, the treatment array is a data structure whose dimensionality is 1×30 where each treatment element of the treatment array represents a single nozzle. Each treatment element in the treatment array can include information regarding each treatment elements associated nozzle (e.g., flow rate, size, etc.).

Figure 3A:
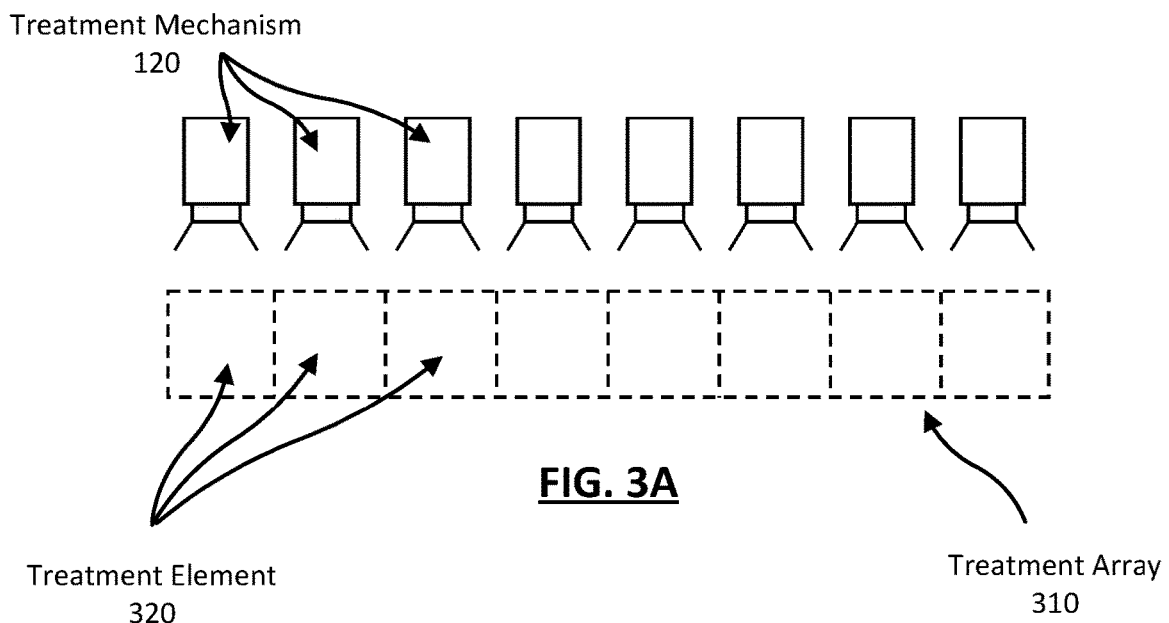
FIG. 3A-3E are visual representations of several example treatment arrays for farming machines with various plant treatment mechanisms, according to some example embodiments.
Figure 3B:
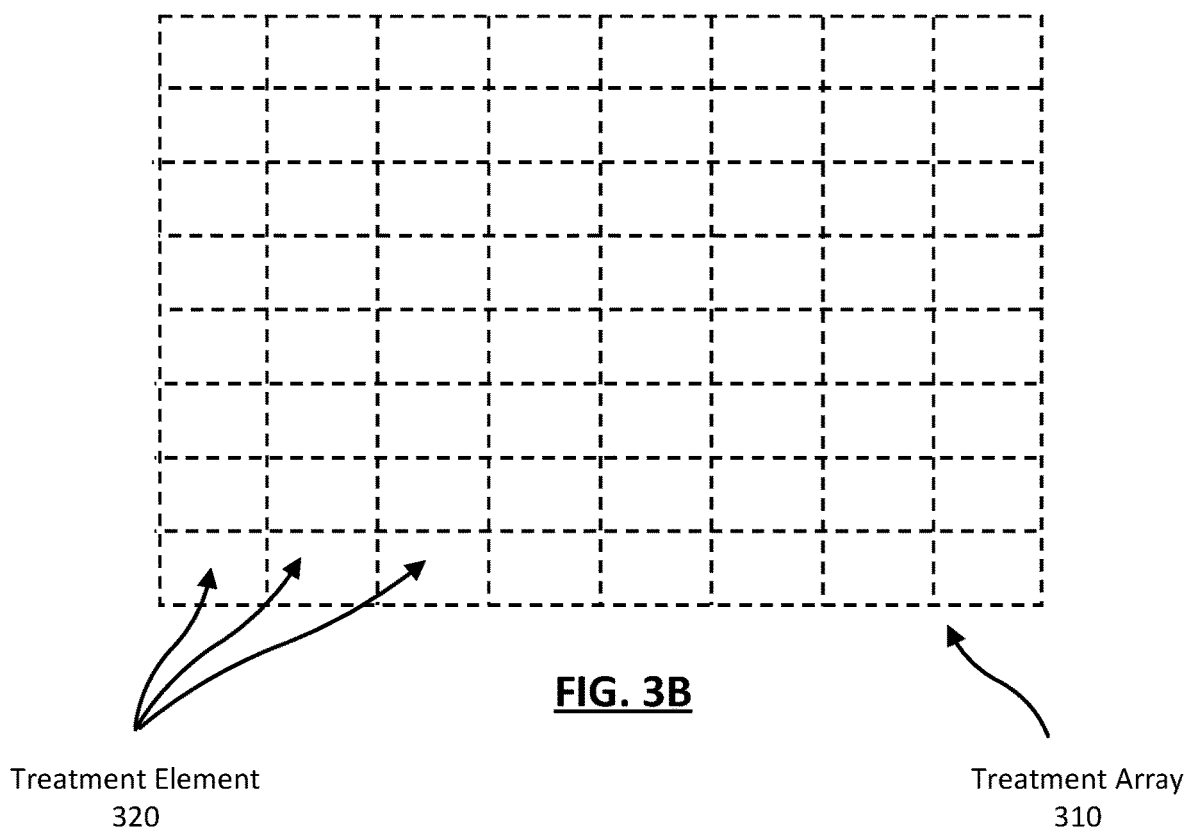
Figure 3C:
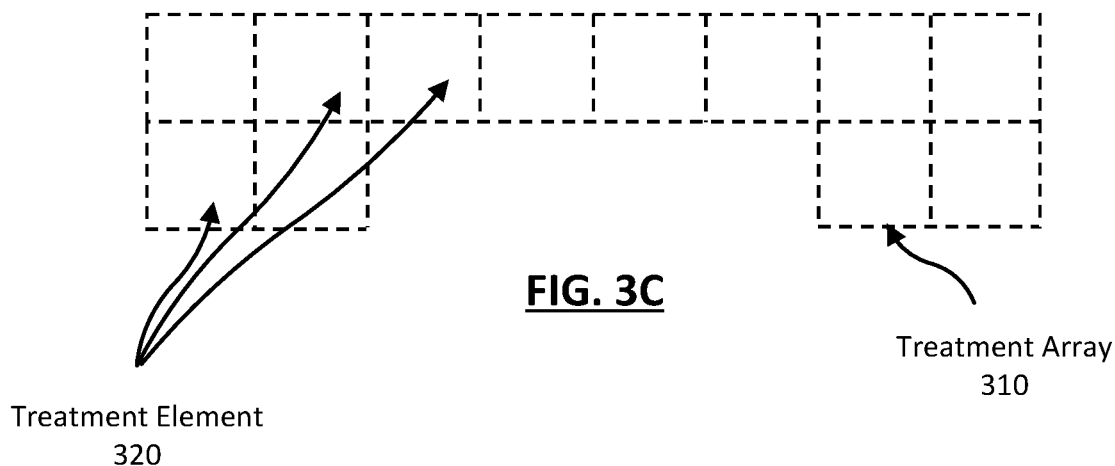
Figure 3D:
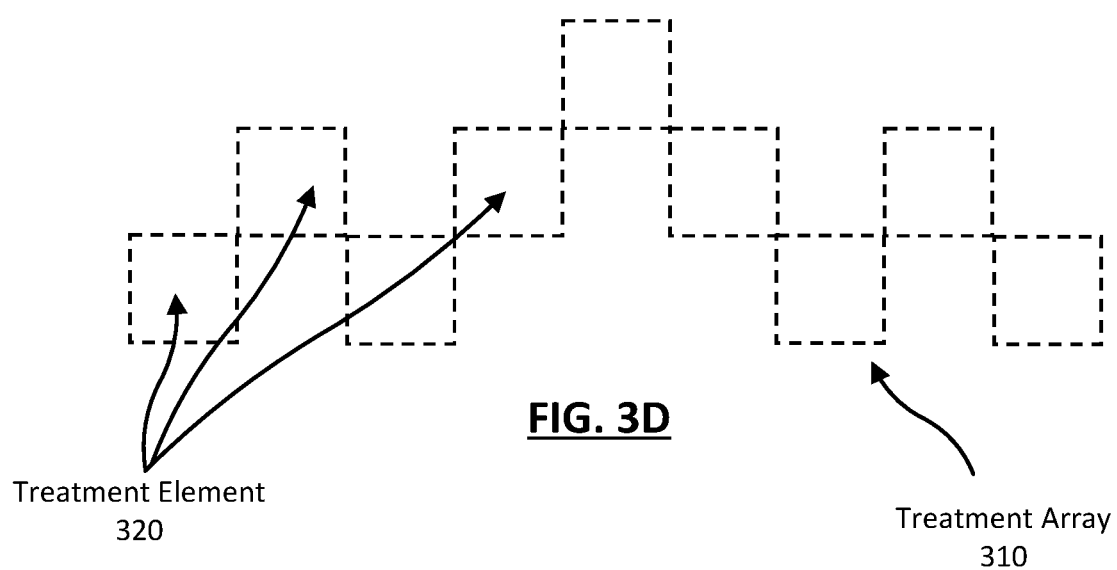
Figure 3E:
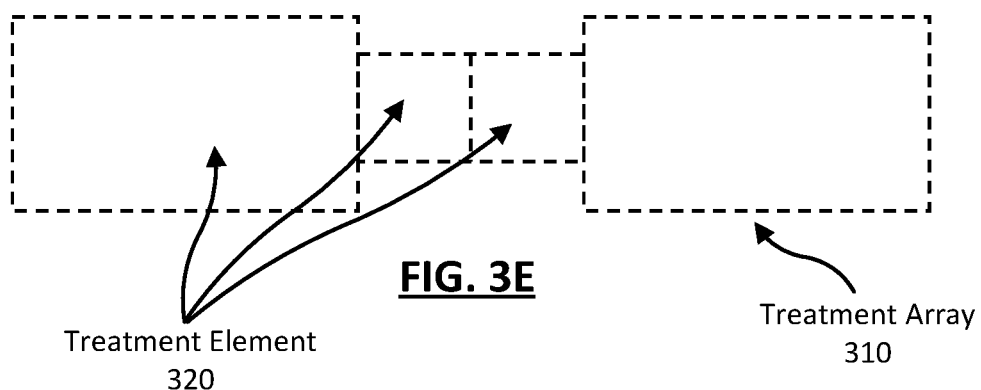

FIG. 3A-3E are visual representations of several example treatment arrays 310 for farming machines 100 with various plant treatment mechanisms 120. Each treatment element 320 of a treatment array 310 corresponds to a treatment mechanism 120 of the farming machine 100. Notably, the dimensionality of some treatment arrays 310 are more complex and can correspond to more complex treatment mechanisms 120 of a farming machine 100. Some treatment arrays 310 include treatment elements 320 with variable heights and widths, include spacing between elements, include treatment elements 320 arranged in unique orientations, etc. Various treatment arrays 310 are shown to illustrate that the dimensionality of a treatment array 310 can be variable and is not intended to be limiting. Further, treatment arrays 310, including both their structure and the information included in each treatment element 320, can change over time (e.g., swapping nozzles, changing flow rates, etc.) or remain constant. FIG. 3A illustrates the treatment mechanisms 120 associated with the treatment elements 320 of a treatment array 310 while the treatment elements 320 of the treatment arrays 310 in FIGS. 3B-3E do not.

III.C Treatment Areas

Each plant treatment mechanism 120 treats a treatment area 122 in the field when the farming machine 100 actuates the treatment mechanism. Thus, because each treatment element 320 in a treatment array 310 is associated with a treatment mechanism 120, each treatment element 320 can also be associated with a treatment area 122. For example, a farming machine 100 includes a single row of thirty identical treatment mechanisms 120 that treat a fixed amount of treatment area 122. As such, the farming machine's 100 associated treatment array 310 has a dimensionality of 1×30. Each treatment mechanism 120 treats a treatment area 122 in the field that is 10 cm×10 cm when actuated. Thus, each treatment element 320 in the treatment array 310 represents a 10 cm×10 cm treatment area 122 in the field such that the treatment array 310 represents an aggregate treatment area 122 of 10 cm×300 cm.

In some configurations, the size and shape of a treatment area 122 and, correspondingly a treatment element 320, may be a function of farming machine characteristics. For example, the treatment area 122 can be based on the speed of the farming machine 100, direction of the farming machine 100, orientation of the treatment mechanism 120, the size of the treatment mechanism 120, flow conditions of a treatment fluid, amount of time the treatment mechanism 120 is actuated, etc.

For example, a treatment mechanism 120 is a nozzle that sprays treatment fluid. The nozzle is oriented such that the spray pattern of the treatment fluid is a horizontal line orthogonal to the direction of movement off the farming machine 100. In this example, the nozzle spray pattern is approximately 2.5 cm wide, the treatment time off the nozzles is 0.1 s, and the velocity of the farming machine is 2.5 m/s. Accordingly, the treatment area 122 for the farming machine traveling at this velocity can be approximated with the following the equation:

$$A = v \cdot w \cdot t \quad (1)$$

where A is the treatment area 122, v is the velocity, w is the treatment width, and t is the treatment time. In other configurations, the treatment area 122 can be approximated by other equations.

In this example, the treatment area 122 for the spray nozzle is approximately 6.25 mm$^2$. Assuming that the treatment time is the minimum controllable treatment time for the nozzle, 6.25 mm$^2$ is the minimum treatment area 122 for the spray nozzle when the farming machine is travelling at 2.5 m/s. If the spray nozzle is a single nozzle of a 1×30 array of spray nozzles, then the aggregate treatment area 122 is 18.7 cm$^2$. In some configurations, each treatment element 320 of a treatment array 310 is associated with minimum treatment area 122 of a treatment mechanism 120. For example, the preceding description of a farming machine 100 including treatment mechanisms 120 with fixed treatment areas 122, those treatment areas 122 may be the minimum treatment areas 122 of the farming machine 100 due to limitations of the treatment mechanism 120 or limitations to actuation of the treatment mechanisms 120.

In various embodiments, a treatment area 122 can be calculated by the control system 130 of the farming machine 100. For example, the control system 130 can access information regarding any of the aforementioned factors used to determine the treatment area 122 and determine the treatment area 122 based on that information.

III.D Mapping Treatment Arrays to Accessed Images

A treatment array 310 can be mapped to an accessed image 210 because groups of pixels representing real-world areas in an accessed image 210 can be configured to correspond to a treatment area 122 of a treatment mechanism 120. As such, if a real-world area corresponds to a treatment area 122 of a treatment mechanism 120, the treatment element 320 of a treatment array 310 corresponding to that treatment mechanism 120 can also correspond to that real-world area.

For example, a treatment array 310 is 1×8 treatment elements 320 with each treatment element corresponding to a treatment mechanism 120 with a treatment area 122 of 5 cm×10 cm. Each pixel in an accessed image corresponds to 1 mm×1 mm. Therefore, each treatment element 320 of the treatment array 310 corresponds to 50 pixels×100 pixels of the accessed image 210 and the treatment array 310 corresponds to 50 pixels by 1000 pixels. Accordingly, the control system 130 can map the treatment array 310 to an accessed image 210. The control system 130 can align the mapping of the treatment array to the accessed image in a variety of manners. In one example, the center of the accessed image 210 can correspond to the center of the array of treatment mechanisms 120 of the farming machine 100. In another examples, the control system 130 may align the mapping by cross-referencing calibration between a detection mechanism 110 and a verification mechanism 150 with a keypoint detector that matches images taken from different viewpoints, estimates camera height from ground and estimates a pixel density (in pixels per inch). In yet another example, the control system may cross-reference treatment mechanism commands to detected treatments in the accessed image with a pixelwise segmentation network configured for detecting treatments.

Figure 4:
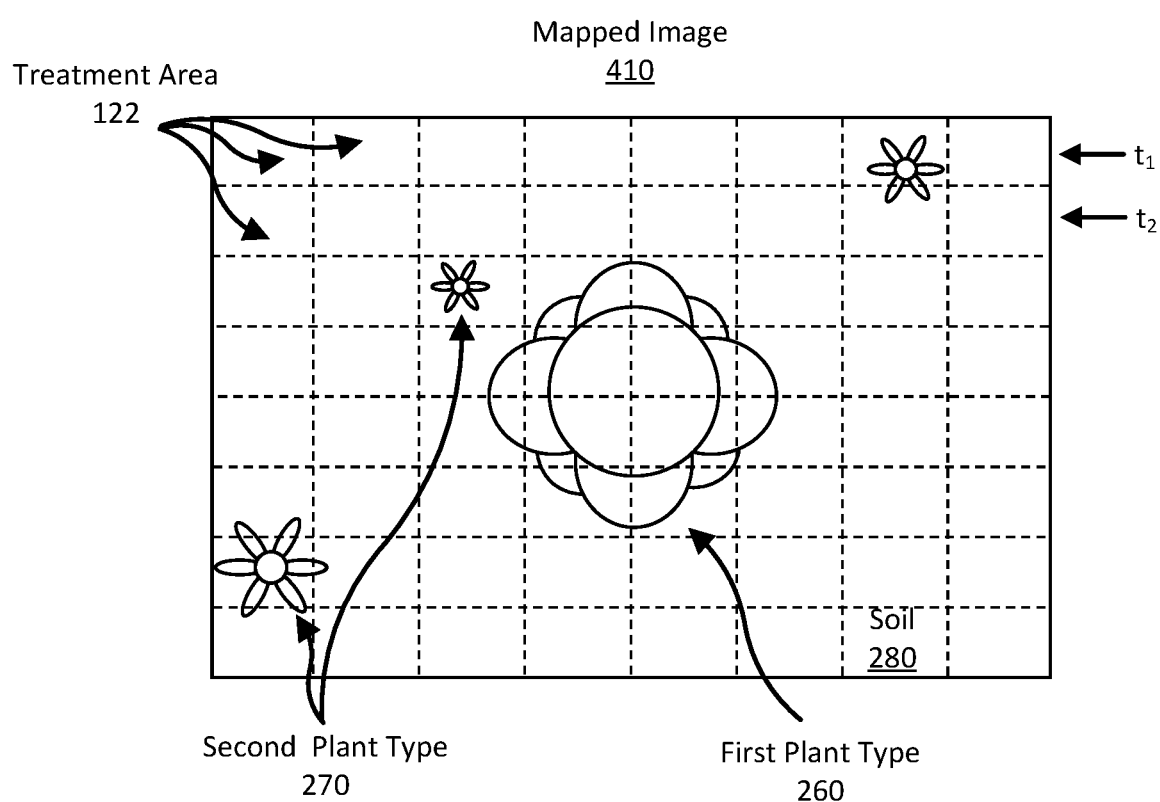
FIG. 4 illustrates an access image with a treatment array mapped to its pixels, according to one example embodiment.

FIG. 4 illustrates an accessed image 210 with a treatment array 310 mapped to its pixels (mapped image 410). FIG. 4 shows the accessed image 210 of FIG. 2 with an array of treatment areas 122 mapped to the mapped image 410. The treatment areas 122 are illustrated as a dashed lines within the mapped image 410. Each treatment area 122 in the image corresponds to a treatment element 320 of a treatment array 310. In this example, the treatment areas 122 correspond to a treatment array 310 similar to the treatment array 310 of FIG. 3B. Because each treatment area 122 is mapped to a set of pixels in the mapped image 410, the various treatment areas 122 in the mapped image 410 include information representing any of a plant of the first type 320, a plant of the second type 330, and soil 340 of the field.

The treatment areas 122 in FIG. 4 can also correspond to the treatment array 310 of FIG. 3A mapped to the accessed image 210 of FIG. 3. In this case, a farming machine 100 is moving through the field and each row of treatment areas 122 in the mapped image 410 illustrates how the treatment array 310 progresses through the field as the farming machine 100 travels. That is, at a first time $t_1$ the treatment areas 122 of the treatment mechanisms 120 are located at the first row. At a second time $t_2$ the farming machine 100 has moved through the field and the treatment areas 122 are now located at the second row, etc.

In various embodiments, mapping a treatment array 310 to an accessed image 210 can occur at various times. In one example, a control system 130 may map a treatment array 310 to an accessed image 210 and then identify plants in the image. In another example, a control system 130 may identify plants in an image and the map a treatment array 310 to the identified plants. Whatever the configuration, identified plants can be associated with treatment elements 320 of the treatment array 310 such that the farming machine 100 can appropriately treat plants with treatment mechanisms 120.

II.E Treatment Maps

The control system 130 generates a treatment map to control plant treatment by treatment mechanisms 120 of a farming machine 100. Broadly, a treatment map indicates which treatment mechanisms 120 of a farming machine 100 are actuated to appropriately treat plants in a field according to a treatment plan. More specifically, a treatment map is a treatment array 310 mapped to an accessed image 210 and includes information regarding which treatment elements 320 of the treatment array 310 include identified objects. Therefore, a treatment map is similarly structured to a treatment array and has the treatment dimensionality.

A treatment map includes map elements that each correspond to treatment areas 122 of a treatment mechanism 120. Further, as shown herein, each map element in a treatment map can correspond to a treatment area 122 in an accessed image 210. In a treatment map, each map element may also include information as to what objects are identified in the corresponding treatment areas 122 of an accessed image 210. For example, a control system 130 accesses an image 210 and processes the information in that image to determine pixels indicating plants. The control system 130 associates the identified plant pixels of the accessed image 210 to map elements of a treatment map including the identified pixels.

Figure 5:
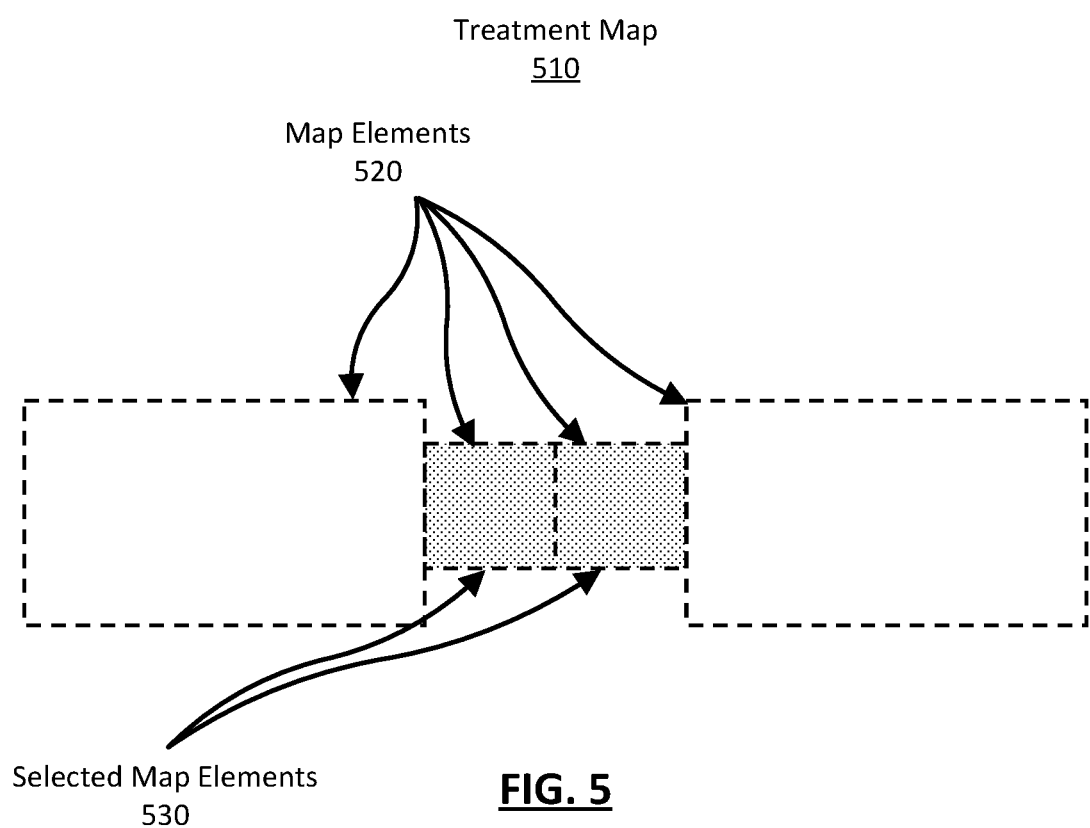
FIG. 5 illustrates an example treatment map, according to one example embodiment.

FIG. 5 illustrates an example treatment map 510. Here, the treatment map 510 includes a similar structure to the treatment array 310 of FIG. 3E. In this example, the control system 130 processes an accessed image 210 and identifies plants in the accessed image 210. The control system 130 maps the treatment elements 320 of the treatment array 310 to the accessed image 210. The control system 130 generates a treatment map by associating identified plants to treatment elements 320 of a treatment array 310, thereby generating map elements 520 of a treatment map 510. In this example, the identified plants are associated with the selected map elements 530 (illustrated as shaded map elements) at the center of the treatment map 510. The control system 130 can actuate the treatment mechanisms 120 associated with the selected map elements 530 (or unselected map elements) to treat treatment areas 122 based on a treatment plan.

IV. Plant and Object Identification Methods

As described above, processing images to quickly and precisely identify plants according to a treatment plan is a challenging problem. Oftentimes, a farming machine 100 sacrifices identification accuracy for processing speed and vice versa. Traditionally, there have been several methods implemented to identify plants within an accessed image 210. Some example methods include: bounding box methods, color identification methods, normalized difference vegetation index based methods, etc. One drawback of traditional plant identification methods is the overestimation of necessary treatment areas 122 in a treatment plan to decrease processing time.

Figure 6A:
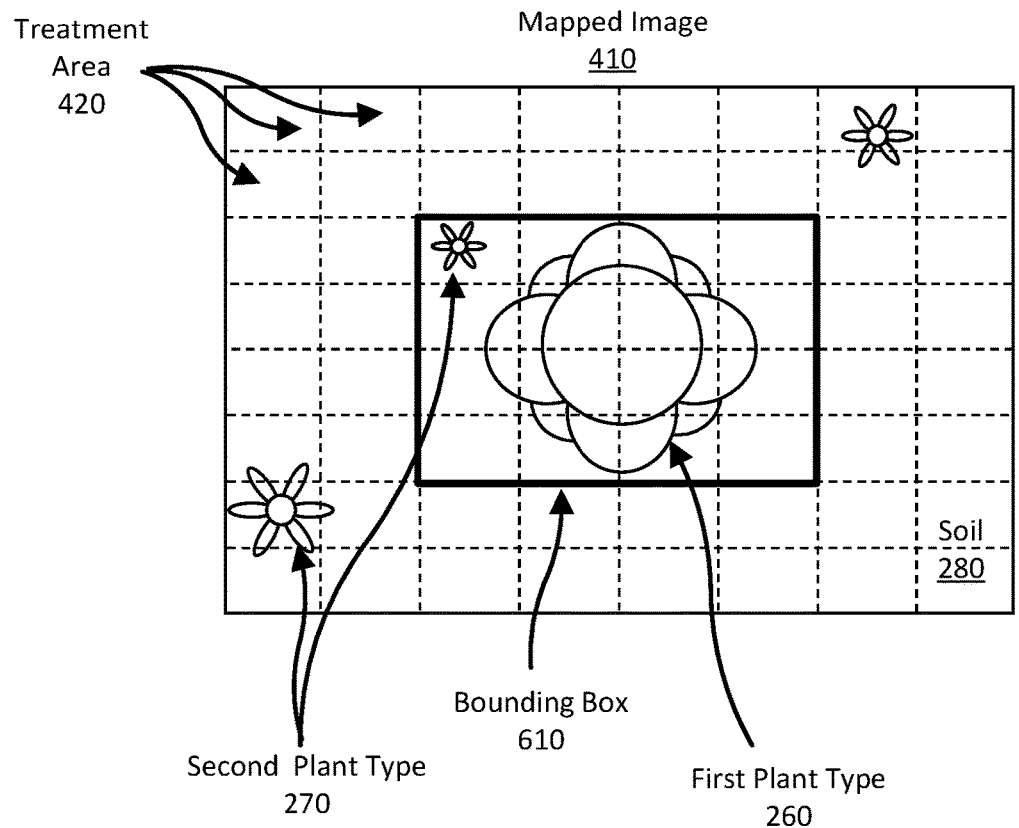
FIGS. 6A and 6B illustrate a mapped image and a treatment map generated from the mapped image using a traditional bounding box method to identify and treat plants with a farming machine, according to one example embodiment.
Figure 6B:
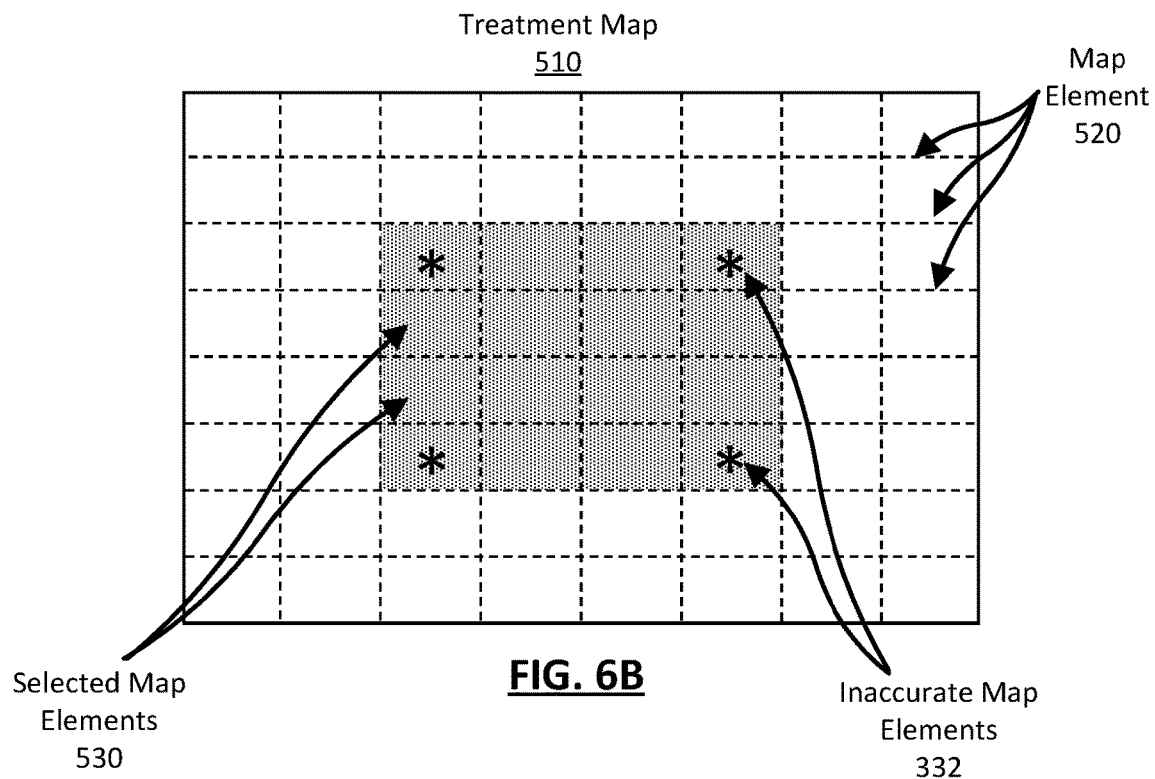

FIGS. 6A and 6B illustrate a mapped image 410 and a treatment map 510 generated from the mapped image 410 using a traditional bounding box method to identify and treat plants with a farming machine 100. Each illustrated treatment area 122 corresponds to a treatment element 320 of a treatment array 310.

The bounding box method may overestimate the treatment areas 122 for treating plants according to a treatment plan. For example, a farming machine 100 executes a treatment plan to selectively identify and treat a first type of plant 260 in a field with a growth promoter from a treatment mechanism 120. The method identifies pixels within a mapped image 410 that are likely to include a plant of the first type 320 and places them within a bounding box 310. For example, referring to the mapped image 410 of FIG. 6A, the bounding box 310 is generally rectangular or square in shape and includes pixels indicating a plant of the first type 320. Also, in this example, the edges of a bounding box 610 are mapped to the edges of treatment areas 122, but may be mapped to any other area in the accessed image 210.

A control system 130 generates a treatment map 510 by mapping the bounding box 320 and its constituent identified object(s) to map elements 520 of a treatment map 510. That is, the control system 130 associates identified objects to treatment elements 320 of the treatment array 310 of the mapped image 410 that include those objects to generate a treatment map 510.

FIG. 6B illustrates a treatment map 510 generated from the bounding box 610 and mapped image 410 of FIG. 6A. The treatment map 510 includes both map elements and selected map elements 330 (shaded). In this example, selected map elements 530 correspond to treatment areas 122 of the accessed image 210 bounded by the bounding box 320. The selected treatment elements 530 will be treated by the treatment mechanisms 120 of the farming machine 100. Notably, because the bounding box 610 was rectangular, the selected map elements 330 also form a rectangle. Because the bounding box 610 conformed to a particular shape that was subsequently used to generate a treatment map 510, the selected treatment elements 530 include inaccurate map elements 532 (indicated by a '*'). Inaccurate map elements 532 correspond to treatment areas 122 having only soil 340 or soil and the second type of plant 270.

In this example, the farming machine 100 actuates the treatment mechanisms 120 associated with the selected map elements 530 of the treatment map 510 and treats the treatment areas 122 corresponding to the selected map elements 530 with a growth promoter. The identified plant of the first type 260 is treated with a growth promoter as intended. However, a plant of the second type 270 is unintentionally treated with the growth promoter and, additionally, areas of the field not including the first type of plant 260 (e.g., only soil 280) are treated with the growth promoter. As such, in this example, the bounding box method can be wasteful and detrimental to field health.

V. Semantic Segmentation

Figure 7A:
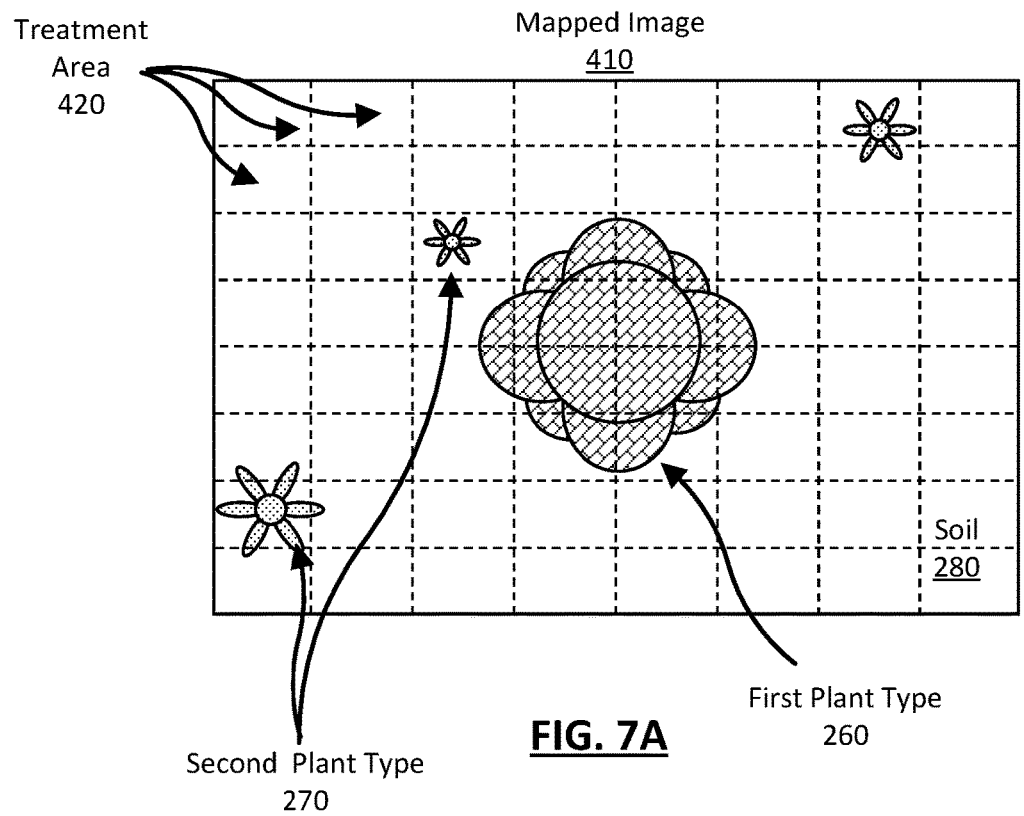
FIGS. 7A and 7B illustrate a mapped image and a treatment map generated from the mapped using a semantic segmentation method to identify and treat plants with a farming machine, according to one example embodiment.
Figure 7B:
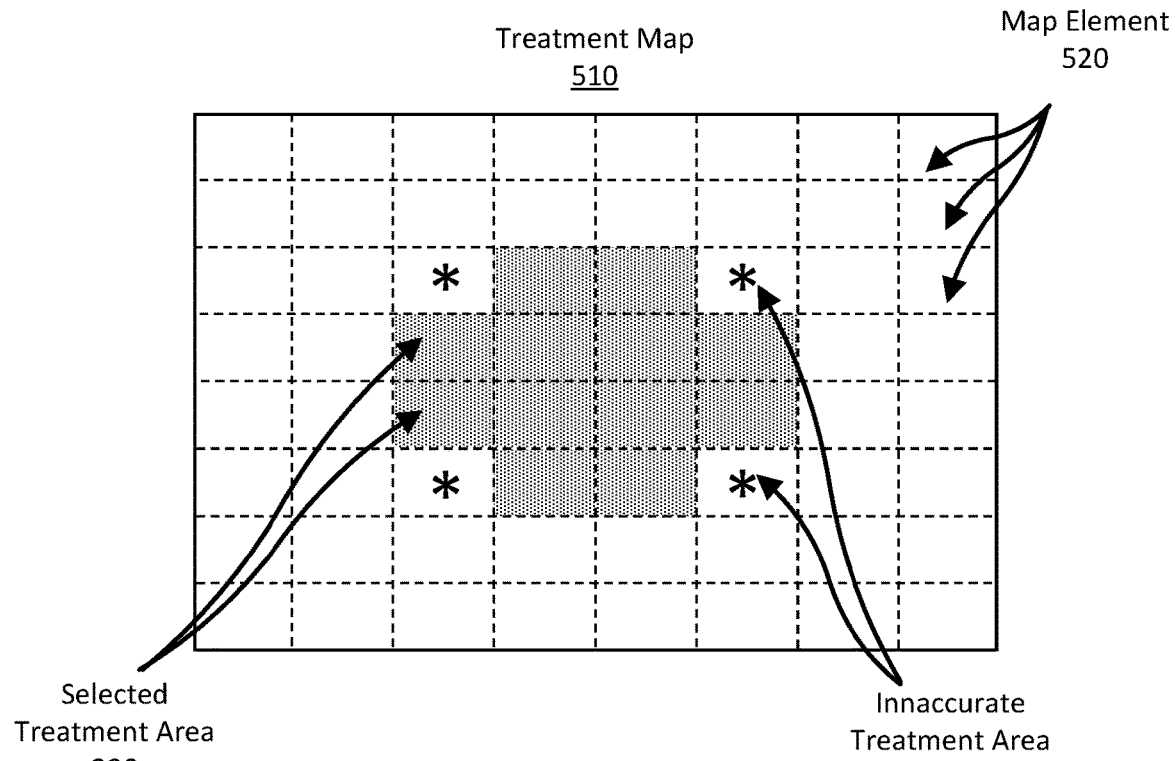

Pixelwise semantic segmentation is a general identification method that, when applied to the problem of identifying plants, may be faster and more accurate than other plant identification methods. Pixelwise semantic segmentation models are a subset of deep learning methods that operate on fully convolutional encoder-decoder network. FIGS. 7A and 7B illustrate a mapped image 410 and a treatment map 510 generated from the mapped image 410 using a semantic segmentation method to identify and treat plants with a farming machine 100. Each illustrated treatment area 122 corresponds to a treatment element 320 of a treatment array 310.

In this example, the farming machine 100 is configured to identify the first type of plant 260 and treat the first type of plant 260 with a growth promoter. The control system 130 identifies groups of pixels in a mapped image 410 as the first type of plant 260 using semantic segmentation. The control system 130 similarly identifies groups of pixels representing the second type of plant 270 in the mapped image. For example, referring to the mapped image 410 of FIG. 7A, the mapped image 410 illustrates groups of pixels likely to represent plants of a first type 260 with a first type of fill and groups of pixels likely to represent plants of a second type 270 with a second type of fill. Contrary to the bounding box method, the identified groups of pixels can take any shape and are not limited to a bounding box.

FIG. 7B illustrates a treatment map 510 generated from pixels identified as the first type of plant 260 in the mapped image 410 using semantic segmentation. In this example, selected map elements 530 are treatment areas 122 corresponding to all treatment areas 122 including pixels in the accessed mapped 410 identified as the first type of plant 260. Because the identified pixels can take any size or shape, the treatment map 510 no longer includes selected map elements 530 that are inaccurate treatment map elements 532. Therefore, the farming machine 100 only applies growth treatment to treatment areas 122 including the first plant type 260.

Figure 8:
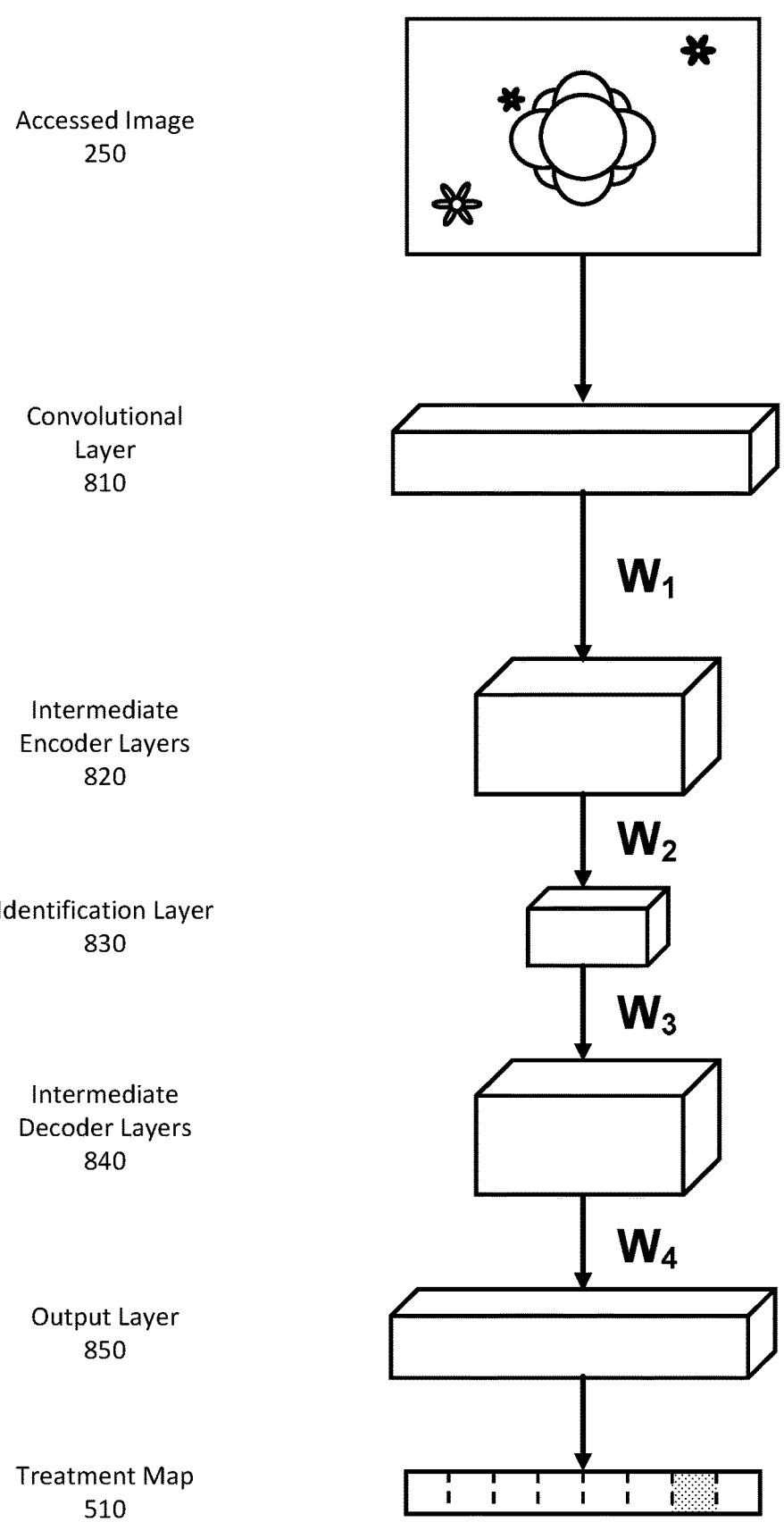
FIG. 8 is a representation of a plant identification model based on accessed images and previously identified plants, according to one example embodiment.

Semantic segmentation can be implemented by a control system 130 using a plant identification model. A farming machine 100 can execute the plant identification model to identify features (e.g., plants) in an accessed image 210 and quickly generate an accurate treatment map 510. FIG. 8 is a representation of a plant identification model 800 based on accessed images 210 and previously identified plants. The previously identified plants may have been identified by another plant identification model or a human identifier.

In the illustrated embodiment, referred to throughout the remainder of the specification, the plant identification model 800 is a convolutional neural network model with layers of nodes, in which values at nodes of a current layer are a transformation of values at nodes of a previous layer. A transformation in the model is determined through a set of weights and parameters connecting the current layer and the previous layer. For example, as shown in FIG. 8, the example model 800 includes five layers of nodes: layers 810, 820, 830, 840, and 850. The transformation from layer 810 to layer 820 is given by $W_1$, the transformation from layer 820 to layer 830 is given by $W_2$, the transformation from layer 830 to layer 840 is given by $W_3$, and the transformation from layer 840 to layer 850 is given by $W_4$. In some examples, the transformation can also be determined through a set of weights and parameters used to transform between previous layers in the model. For example, the transformation $W_1^T$ from layer 840 to layer 850 can be based on parameters used to accomplish the transformation $W_1$ from layer 810 to 820.

The input to the model 800 is an accessed image 210 (or a mapped image 410) encoded onto the convolutional layer 810 and the output of the model is a treatment map 510 decoded from the output layer 850. The model 800 identifies latent information in the accessed image representing plants in the identification layer 830. The model 800 reduces of the dimensionality of the convolutional layer 810 to that of the identification layer 830 to identify the plants, and then increases the dimensionality of the identification layer 830 to generate a treatment map 510.

The accessed image 210 is encoded to a convolutional layer 810. In one example, accessed image is directly encoded to the convolutional layer 810 because the dimensionality of the convolutional layer 810 is the same as the pixel dimensionality of the accessed image 210. In other examples, the accessed image 210 can be adjusted such that the dimensionality of the accessed image 210 is the same as the dimensionality of the convolutional layer 810.

Accessed images 210 in the convolutional layer 810 can be related to plant identification information in the identification layer 830. Relevance information between these elements can be retrieved by applying a set of transformations between the corresponding layers. Continuing with the example from FIG. 8, the convolutional layer 810 of the model 800 represents an encoded accessed image 210, and identification layer 830 of the model 800 represents plant identification information. Plants in a given accessed image 210 may be identified by applying the transformations $W_1$ and $W_2$ to the pixel values of the accessed image 210 in the space of convolutional layer 810. The weights and parameters for the transformations may indicate relationships between information contained in the accessed image and the identification of a plant. For example, the weights and parameters can be a quantization of shapes, colors, etc. included in information representing plants included in an accessed image 210. The weights and parameters may be learned historical user interaction data including plant identification submitted by users.

In one example, the weights and parameters can be collected and trained using data collected from previously accessed images 210 and a labelling process. The labelling process reduces the amount of time required by segmentation model 800 to identify pixels representing plants while also increasing the accuracy of identified pixels. The labelling process can include: identifying a bounding box pixels including pixels likely to represent a plant, identifying green pixels within the bounding boxes, identifying a contour around the identified green pixels, using the contours to create a label set for the accessed image, and sending the labelled image to users for verification. Users verify labels by identifying which pixels are green near the contours in an accessed image rather than an entire image. In effect, this "pre-identification" by model 800 reduces the number of pixels need to be verified by a human and reduces the costs of training the semantic segmentation model 800.

Plants in the accessed image 210 are identified in the identification layer 830. The identification layer 830 is a data structure representing identified plants based on the latent information about the plants represented in the accessed image 210. The identification layer has a dimensionality less than the pixel dimensionality and treatment dimensionality.

Identified plants in an accessed image 210 can be used to generate a treatment map 510. To generate a treatment map, the model 800 starts at the identification layer 830 and applies the transformations $W_2$ and $W_3$ to the value of the given identified plants in the identification layer 830. The transformations result in a set of nodes in the output layer 850. The weights and parameters for the transformations may indicate relationships between an identified plants and a treatment map 510. In some cases, the plant treatment map 510 is directly output from the nodes of the output layer 850, while in other cases the control system decodes the nodes of the output layer 850 into a treatment map 510. That is, model 800 can include a conversion layer (not illustrated) that converts the output layer 850 to a treatment map 510.

Take, for example, a model 800 the produces an output image with an arbitrary set of pixels marked to indicate the presence of a plant at output layer 850. A conversion layer can convert the output image into a set of boxes that generate a treatment map 510. Most generally, the conversion layer receives a two dimensional array (e.g., an output image) as input and outputs a list of quadruples representing a box. Each box of the list is defined such that pixels indicating an identified plant in the output image approximately match the area of the box. Each box can be associated with a treatment area 122 such that farming machine 100 treats plants identified in the accessed image 210 that are represented in the output image. In some examples, the conversion layer is governed by a policy that sets a value of a box to a 0 or 1 according to the treatment plan. For example, if the treatment plan is to treat an identified plant the policy may set a value for a box to 1. Further, the conversion layer can include a treatment resolution. The treatment resolution represents the smallest size of a box that can correspond to a treatment area 122 of a treatment mechanism 120. Take, for example, a conversion layer including a treatment resolution of 8 pixels. In this case, if an output image includes a set of pixels indicating a plant that is 6 pixels, the conversion layer can create a box that is 8 pixels rather than 6 pixels. The conversion layer creates a larger box because a box representing 6 pixels is below the treatment resolution.

Here, the output of the model 800 is dissimilar to that of a traditional encoder/decoder scheme. Generally, the output layer 850 of a traditional convolutional neural network has the same, or nearly the same, dimensionality as the convolutional layer 810. That is, given the example of an accessed image 210 as an input, the convolutional layer 810 and the output layer 850 both have the pixel dimensionality. This allows a convolutional neural network to identify objects in an accessed image 210 and map them back to the original input accessed image 210. Traditionally, decoding objects identified in the identification layer 830 to an image having the same dimensionality as the convolutional layer 810 is computationally expensive and requires additional processing time. In this example, the dimensionality of the treatment map 510 is the treatment dimensionality of a farming machine 100. Generally, the treatment dimensionality (e.g., 1×30 treatment mechanisms 120) is much less than the pixel dimensionality (e.g., 2880×3840 pixels) and, therefore, decoding the identified plants in the identification layer 830 to a treatment map 510 requires fewer transformations and less processing time.

Additionally, the model 800 can include layers known as intermediate layers. Intermediate layers are those that do not correspond to an accessed image 210, plant identification, or a treatment map 510. For example, as shown in FIG. 4, layers 820 are intermediate encoder layers between the convolutional layer 810 and the identification layer 830. Layer 840 is an intermediate decoder layer between the identification layer 830 and the output layer 850. Hidden layers are latent representations of different aspects of a plant that are not observed in the data, but may govern the relationships between the elements of an image when identifying a plant. For example, a node in the hidden layer may have strong connections (e.g., large weight values) to input values and identification values that share the commonality of "green leaves." As another example, another node in the hidden layer may have strong connections to input values and identification values that share the commonality of "sprayed ground." Specifically, in the example model of FIG. 4, nodes of the hidden layers 820 and 840 can link inherent information in the accessed image that share common characteristics to help determine if that information represents a plant in the accessed image.

Additionally, each intermediate layer is a combination of functions such as, for example, residual blocks, convolutional layers, pooling operations, skip connections, concatenations, etc. Any number of intermediate encoder layers 820 can function to reduce the convolutional layer to the identification layer and any number of intermediate decoder layers 840 can function to increase the identification layer 830 to the output layer 850. Alternatively stated, the encoder intermediate layers reduce the pixel dimensionality to the identification dimensionality, and the decoder intermediate layers increase the identification dimensionality to the treatment dimensionality.

In one particular example, an intermediate layer can include a dice loss layer for semantic segmentation. The function of a dice loss layer can be defined as:

$$softDiceCoeff(p, g) = \frac{2\Sigma_i p_i * g_i}{\Sigma_i p_i + \Sigma_i g_i} \quad (1)$$

and $$\text{Dice Loss} = 1 - softMeanDiceCoeff \quad (2)$$

where $p_i$ is the probability of outputs of a softmax layer and g is the ground truth. In equation 2, the "mean" in softMeanDiceCoeff indicates that the dice coefficient may calculated for numerous classes in the model and then averaged.

Furthermore, in various embodiments, the functions of the model 800 can reduce the accessed image 210 and identify any number of objects in a field. The identified objects are represented in the identification layer 830 as a data structure having the identification dimensionality. In various example, the model can be configured to identify a location of a plant, a condition of a plant, a type of a plant, a category of a plant (e.g., a weed or a crop), or any other characteristics of a plant in the field. In various other embodiments, the identification layer can identify latent information representing other objects in the accessed image. For example, the identification layer 830 can identify a result of a plant treatment, soil, an obstruction, or any other object in the field.

VI. Treatment Maps to Control Treatments of a Farming Machine

A treatment map 510 can be used by a farming machine 100 to treat plants in a field. As previously described, a treatment map 510 includes any number of map elements 520. Each map element 520 in a treatment map 510 is associated with a treatment area 122 in an accessed image 210. Each map element 520 can also include information regarding identified objects in the treatment areas 122 associated with that map element 520. As such, a treatment map 510 can be used to control treatment mechanisms 120 of a farming machine 100 to appropriately treat plants according to a treatment plan.

For example, a control system 130 can input a treatment map 510 and output control signals. The control signals are sent to treatment mechanisms 120 of the farming machine 100 to actuate the treatment mechanisms 120. Generally, the control signals are sent at an appropriate time such that the treatment mechanism 120 is actuated while the treatment mechanism 120 is above the identified object.

As an example, a treatment map is a 1×30 data structure where each map element 510 is associated with a spray nozzle. Here, a map element 520 of the treatment map 510 indicates that its associated treatment area 122 in an accessed image 210 contains pixels indicative of a weed. As such, the control system 130 generates control signals for the treatment mechanism(s) 120 associated with the map element 520 such that the treatment mechanism 120 treats the weed as the farming machine 100 travels over the weed in the field.

VII. Plant Identification to Control Treatments of a Farming Machine

A farming machine 100 can execute a plant identification model (e.g., model 800) to identify plants in a field. The plant identification model 800 inputs an accessed image 210 of the field and generates a treatment map 510. The treatment map 510 includes selected map elements 530 associated with treatment areas 122 in the field to be treated with treatment mechanisms 120. The selected map elements 530 are the treatment areas 122 in the accessed image 210 that include an identified plants and, more generally, an area for treatment. The farming machine 100 treats the identified plants based on the treatment map 510 by actuating treatment mechanisms 120 to treat the identified plants.

Figure 9:
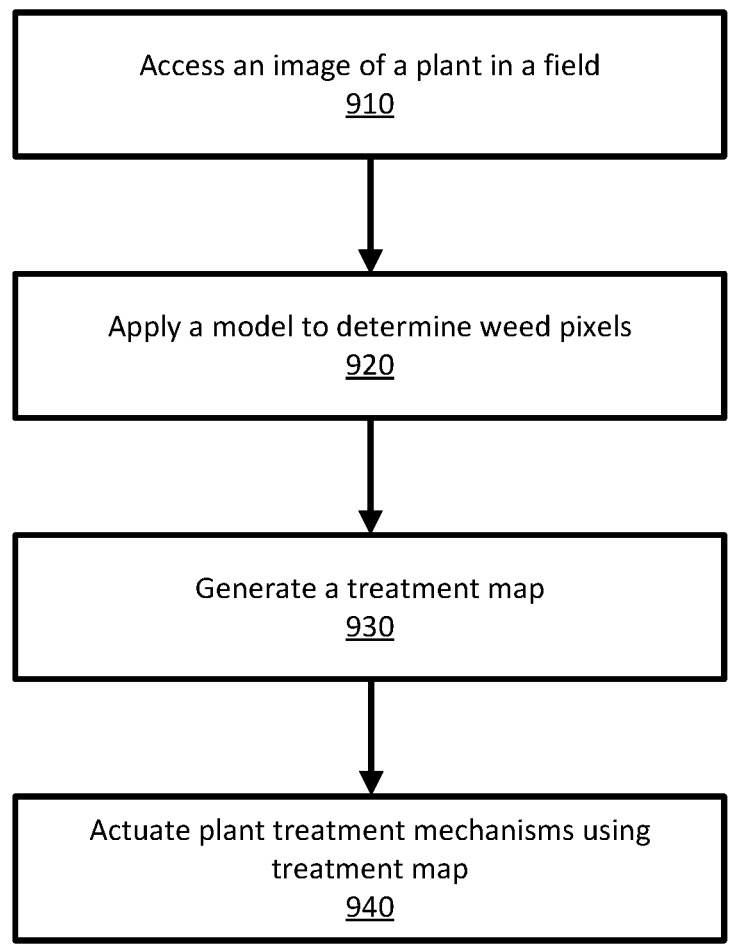
FIG. 9 is a flow diagram illustrating a method for the identification and treatment of weeds in a cotton field, according to one example embodiment.

FIGS. 9 and 10 illustrate a specific example of a farming machine 100 identifying and treating plants using plant treatment mechanisms 120 as the farming machine 100 travels through the field. In this example, the farming machine 100 is a crop sprayer operating in a field planted with cotton (e.g., first plant type 260). The treatment plan for the crop sprayer is to identify weeds (e.g. second plant type 270) in the field and treat them by spraying them with an herbicide. The farming machine 100 is configured with a single row of eight spray nozzles that serve as treatment mechanisms 120. That is, the spray nozzles spray an herbicide when actuated by the farming machine 100. The farming machine 100 includes a detection mechanism 110 that captures images of plants in the field as the farming machine 100 travels down the cotton crop rows. Further, the farming machine 110 includes a control system 130 that identifies plants in the field and controls the spray nozzles.

FIG. 9 is a flow diagram illustrating a method 900 for the identification and treatment of weeds in a cotton field. The method 900 can include additional or fewer steps and the illustrated steps may be accomplished in any order. In some cases, steps may be repeated any number of times before progressing to a subsequent step.

To begin, the farming machine 100 images an area of the field using the detection mechanism 110. The image includes information representing cotton plants, weed plants, and soil in the field. In this example, the detection mechanism 110 is mounted to the front of the farming machine 100 such that the area of the field is imaged before the front end of the farming machine 100 passes over the area. The detection mechanism 110 transmits the image to the control system 130 of the farming machine 100.

Figure 10A:
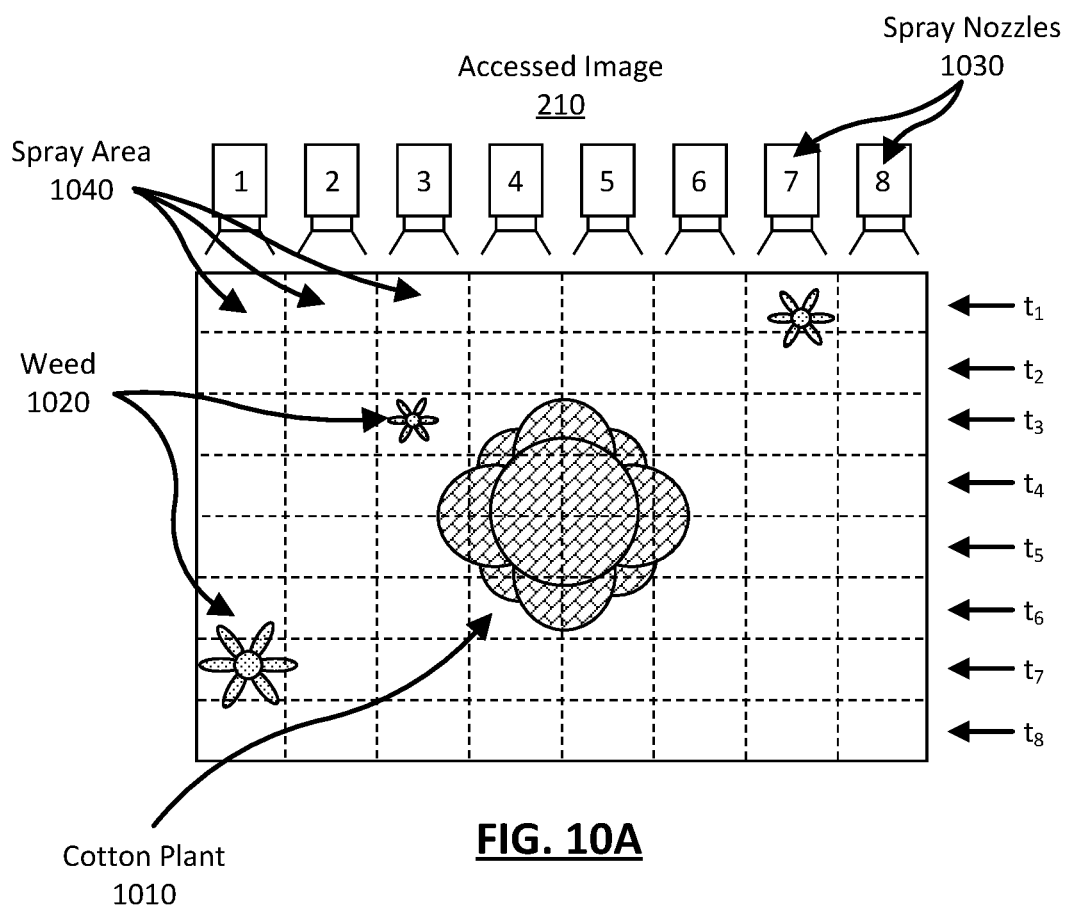
FIG. 10A is an illustration of an accessed image used in the method of FIG. 9, according to one example embodiment.

The control system accesses 910 the image from the detection mechanism and accesses the information included therein. FIG. 10A is an illustration of the accessed image 210. The accessed image 210 includes a cotton plant 1010 near the center of the image and several weeds 1020 spaced about the cotton plant. For convenience, the treatment areas 122 of a treatment array for the farming machine 100 are overlaid on the accessed image 250. In this case the treatment array 420 is an array of spray nozzles 1030 and the treatment areas 122 are spray areas 1040. Spray nozzles 1030 labeled 1 to 8 are pictured above the accessed image 210 and correspond to the treatment areas 122 in the columns below them.

In this example, the spray areas 1040 are shown for eight different treatments of the spray nozzles 630 from time $t_1$ through $t_8$. Thus, each row of illustrated spray areas 1040 corresponds to one treatment of the spray areas 1040 in that row by the farming machine 100 at a particular time. Each illustrated treatment area 122 is the minimum treatment area 122 for the corresponding spray nozzle 1030. Over time, as the farming machine 100 moves through the field, the spray nozzles 1030 and their corresponding spray areas 1040 move down the accessed image 210.

Returning to FIG. 9, the control system applies 920 a model 800 to identify pixels in the accessed image 210 representing weeds 1020. The control system 130 encodes the accessed image 210 onto a convolutional layer 810 of the model 800. Each pixel of the accessed image 210 corresponds to a single node of the convolutional layer 810 such that the pixel dimensionality of the accessed image 210 and dimensionality of the convolutional layer 810 are the same.

The model 800 applies a set of transformations to the convolutional layer 810 to identify weeds 1020 in the accessed image 210. Each transformation identifies latent information in the pixels that represents weeds 1020 and reduces the dimensionality of convolutional layer 810. The transformations reduce the convolutional layer 810 to the identification layer 830. The identification layer 830 is configured to identify weeds, cotton, and soil and, therefore, the identification dimensionality is 1×3.

The control system 130 generates 930 a treatment map 510 from the identification layer 830. The model 800 applies a set of transformations to the identification layer 830 to generate the treatment map 510. Each transformation increases the dimensionality of the identification layer 830 and decodes the identified plants to a new dimensionality. The set of transformations increases the dimensionality of the identification layer to that of the output layer 850.

The output layer 450 has the same dimensionality as the treatment dimensionality (e.g., 1×8) such that the output layer 450 can represent a treatment map. That is, each node of the output layer corresponds to a map element 520 of a treatment map 510 and, thereby, a spray area 1040 of a spray nozzle 1030 of the farming machine 100. Further, each node also includes information regarding objects identified in that spray area 1040 (e.g., weed, cotton, or soil). As such, the control system 130 can decode the nodes of the output layer into a treatment map. In this example, the control system 130 generates a treatment map 510 indicating that for map element 520 of a treatment map 510 including an identified weed, the farming machine 100 actuates the corresponding spray nozzle 1030 to spray herbicide in the appropriate spray area 1040.

Figure 10B:
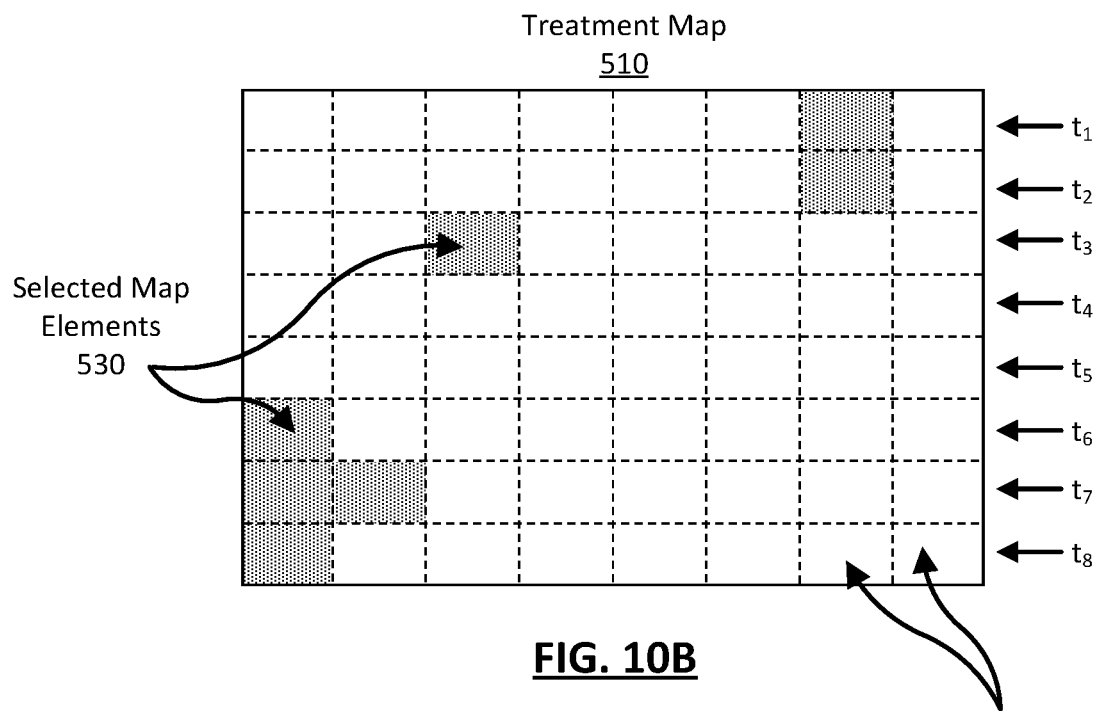
FIG. 10B is an illustration of a treatment map generated from the in the method of FIG. 9, according to one example embodiment.

FIG. 10B illustrates a treatment map 510 generated by the model 800. The treatment map 510 includes map elements 520 corresponding to similarly positioned spray areas 1040 of FIG. 6A. The treatment map 510 also includes selected map elements 530 which correspond to spray areas 1040 that included information representing a weed 1020 in the accessed image 210. Selected map elements 530 will be treated by the farming machine 100 as it travels through the field.

Returning to FIG. 9, the farming machine 100 actuates 940 spray nozzles 630 to spray the spray areas 1040 and treat the weeds 1020 as the farming machine 100 travels through the field. To do so, the control system 130 generates control signals for the spray nozzles 1030 and actuates the spray nozzles 1030 corresponding to selected map elements 530 areas in the treatment map 510 at the appropriate time.

For example, turning to FIGS. 6A and 6B, at time $t_1$ the treatment map 510 indicates a selected map element 530 in the $7^{th}$ column because the corresponding spray area 1040 for the $7^{th}$ spray nozzle 1030 at time $t_1$ included pixels representing a weed 1020. As such, the farming machine actuates the $7^{th}$ spray nozzle 1030 at time $t_1$ to treat the weed 1020 in the corresponding spray area 1040 as the farming machine 100 travels through the field.

The process continues as the farming machine 100 travels through the field. As the farming machine 100 moves, the model 800 generates the appropriate treatment maps 510 to spray herbicide on weeds 1020 and not cotton 1010. For example, continuing from time $t_1$, the farming machine 100 actuates the $7^{th}$ treatment mechanism 120 at time $t_2$, the $3^{rd}$ treatment mechanism 120 at time $t_3$, the $1^{st}$ treatment mechanism 120 at time $t_6$, the $1^{st}$ and $2^{nd}$ treatment mechanism at time $t_7$, and the first treatment mechanism at time $t_8$.

VIII. Semantic Segmentation for Plant Treatment Verification

A farming machine 100 can also be used to verify a plant treatment. For example, rather than accessing an image obtained by the detection mechanism 110, the control system can access an image obtained by the verification mechanism 150 (a "post-image"). The post-image includes both information regarding objects in the field and information regarding any plant treatments executed by the treatment mechanisms 120 of the farming machine 100 (a "treated area"). For example, the post-image may include information regarding a treated area that has been sprayed by a spray nozzle.

A post-image can be used to verify treatments by a treatment plan. To do so, the control system 130 accesses a post-image, determines the location of plant treatments in the post-image, generates an executed treatment map, and compares the executed treatment map to the treatment map.

Figure 11:
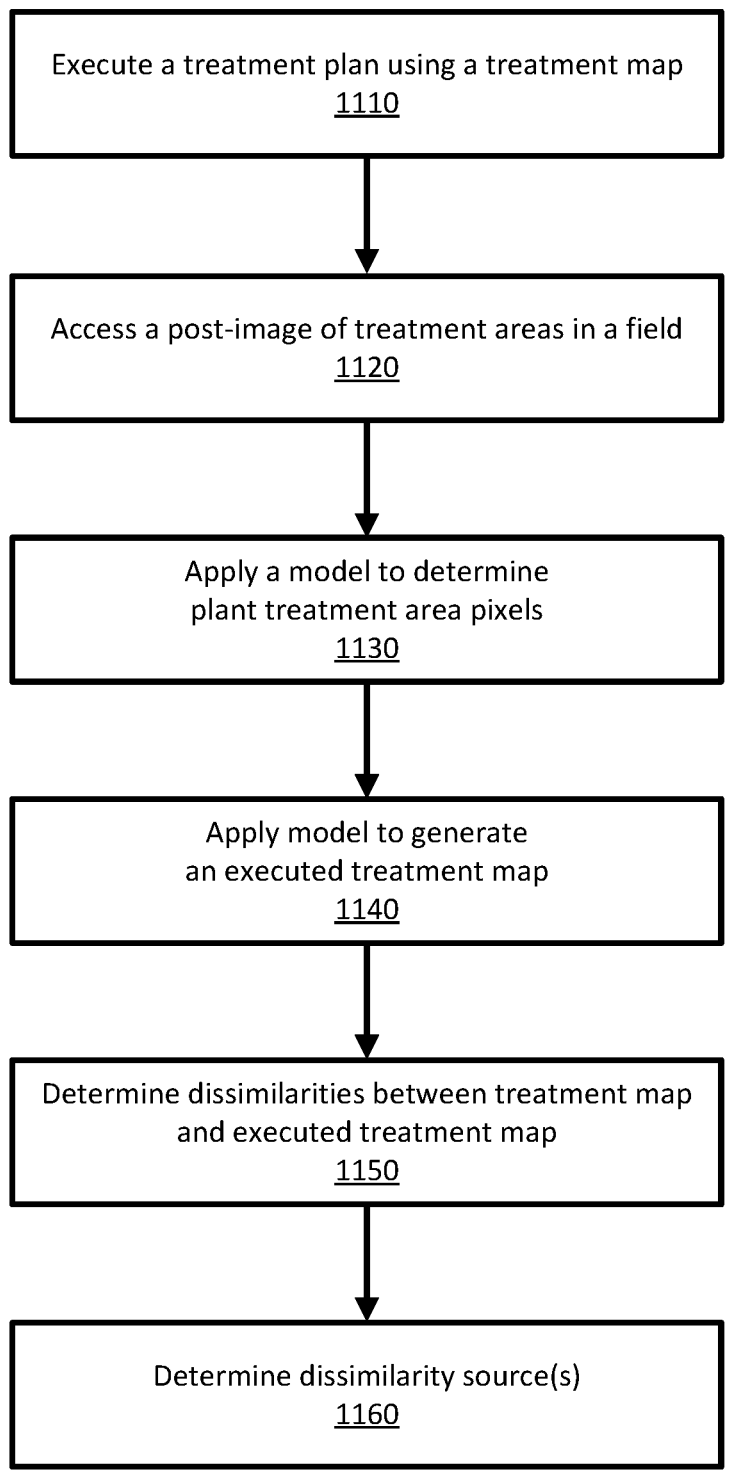
FIG. 11 is a flow diagram illustrating a method for verifying a plant treatment in a field, according to one example embodiment.

FIGS. 11 and 12 illustrate a specific example of a farming machine 100 verifying plant treatments by treatment mechanisms 120 of a farming machine 100 as the farming machine 100 travels through a field. In this example, the farming machine 100 is a crop sprayer operating in a field planted with cotton 1010. The treatment plan for the crop sprayer is to identify cotton in the field and spray them with a fertilizer. The farming machine 100 is similarly configured to the farming machine 100 in the example of FIGS. 9-10.

FIG. 11 is a flow diagram illustrating a method 1100 for verifying a plant treatment in a field. The method 1100 can include additional or fewer steps and the illustrated steps may be accomplished in any order. In some cases, steps may be repeated any number of times before progressing to a subsequent step.

To begin, the farming machine 100 executes 1110 a plant treatment plan. That is, the farming machine 100 images an area of the field using the detection mechanism 110, identifies cotton plants in the field, generates a treatment map 510 based on the identified plants, and actuates the spray nozzles to spray fertilizer on the cotton plants as the farming machine 100 travels through the field. The generated treatment map is stored on a storage system of the farming machine 100.

Next, the framing machine 100 captures a post-image of the area using the verification mechanism 150. The post-image includes information representing the treated areas, cotton plants, weed plants, and soil in the field. In this example, the verification mechanism 150 is mounted to the rear of the farming machine 100 such that the area of the field is imaged after the spray nozzles pass over the area and treat the cotton plants. The verification mechanism 150 transmits the post-image to the control system 130 of the farming machine 100.

Figure 12A:
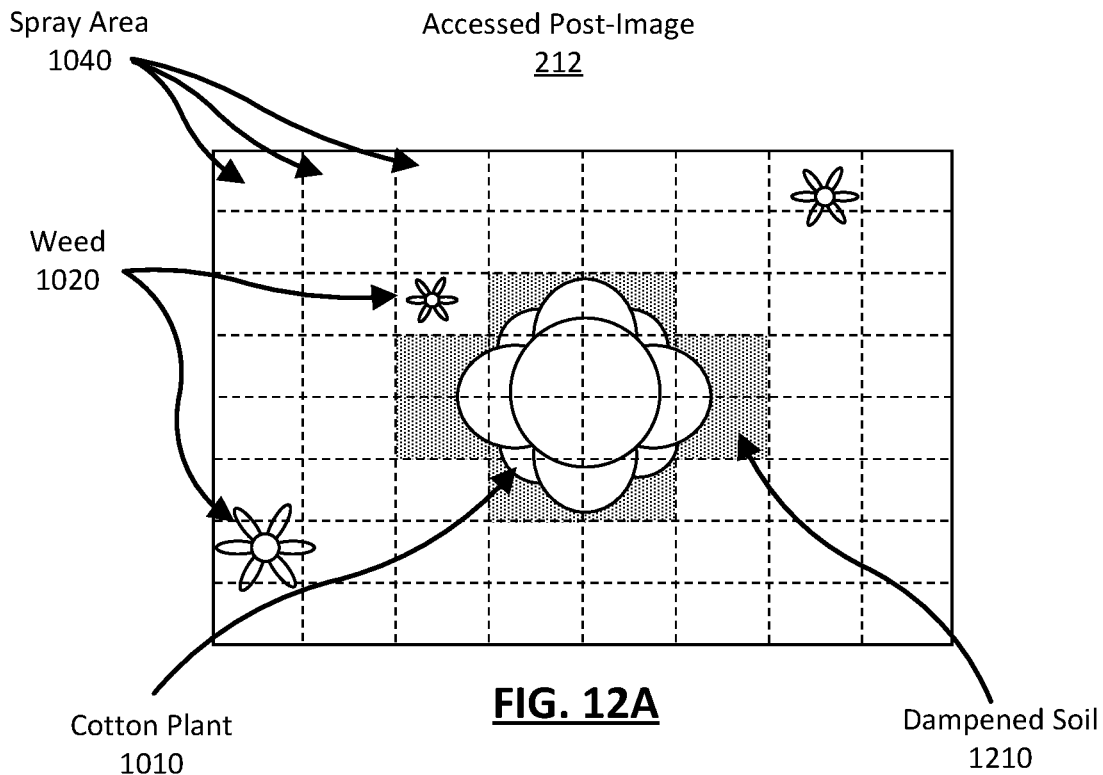
FIG. 12A is an illustration of the accessed post-image in the method of FIG. 11, according to one example embodiment.

The control system 130 accesses 1120 the post-image from the verification mechanism 150 and accesses the information included therein. FIG. 12A is an illustration of the accessed post-image 212. The accessed post-image 212 includes a cotton plant 1010 near the center of the image and several weeds 1020 spaced about the cotton plant 1010. The accessed image 210 also includes information representing a treated area where certain spray areas 1040 have been sprayed by the spray nozzles. In this case, the information indicating a plant treatment is illustrated as dampened soil 1210.

Returning to FIG. 11, the control system applies 1130 a model 800 to identify pixels in the accessed post-image 212 representing a treated. In this case, the model 800 is configured to identify treated areas rather than plants. That is, the control system 130 encodes the accessed post-image 212 onto a convolutional layer 810 of the model 800. The model 800 applies a set of transformations to the convolutional layer 810 to identify a treated area in the accessed post-image 212. The transformations reduce the convolutional layer 810 to the identification layer 830. The identification layer 830 is configured to identify dampened soil 1210 as treated areas.

The control system 130 applies 1140 the model to generate an executed treatment map 510 from the identification layer 830. The executed treatment map indicates which spray areas 1040 include information that indicates that they were previously sprayed by a spray nozzle.

Figure 12B:
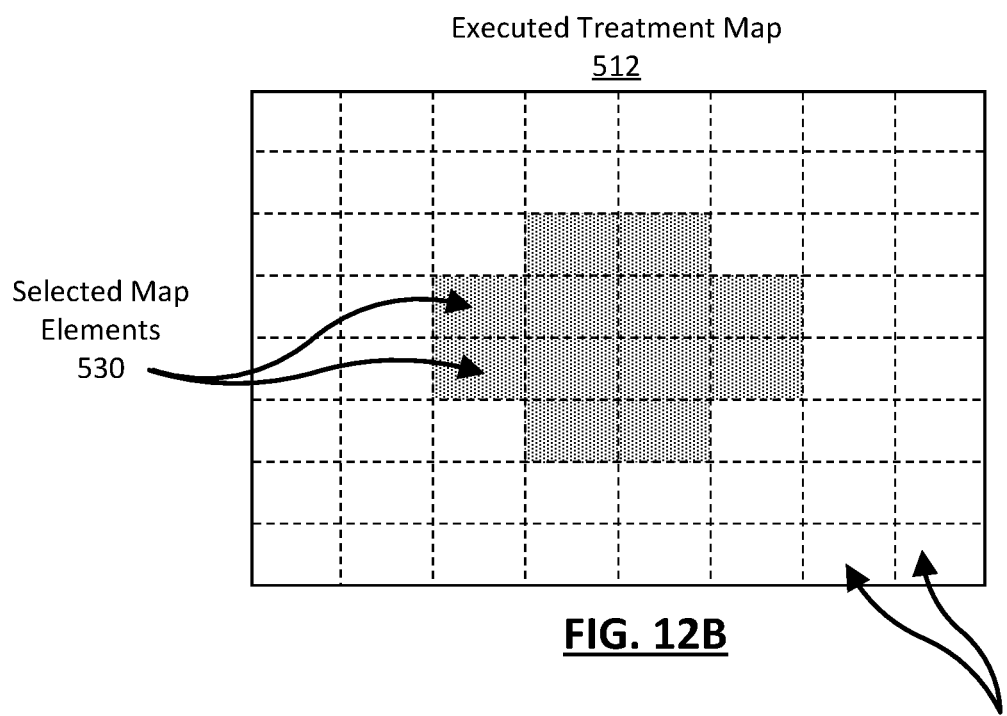
FIG. 12B is an illustration of an executed treatment map generated from the in the method of FIG. 11, according to one example embodiment.

FIG. 12B illustrates an executed treatment map 512 generated by the model 800. The executed treatment map 512 includes map elements 520 corresponding to similarly positioned spray areas 1040 of FIG. 12A. The executed treatment map 512 also includes selected map elements 530 which correspond to spray areas 1040 that included information representing a treated area (e.g., dampened soil 1210) in the accessed post-image 212.

The control system 130 verifies a plant treatment for a particular area by determining a dissimilarity between a treatment map 510 and an executed treatment map 512 for the particular area. If an executed treatment map 512 is the same as a treatment map 510, then the farming machine 100 is appropriately treating plants as it passes by them in the field. If the executed treatment map 512 is dissimilar to the treatment map 510, then the farming machine 100 may not be appropriately treating plants as it passes them in the field.

Once the control system determines a dissimilarity, the control system can determine a source for the dissimilarity. Once the source of the dissimilarity is identified, the control system 130 can notify an operator of the farming machine or take actions to correct the source of the dissimilarities. Correcting the source of the dissimilarities can include re-calibrating spatial awareness of control system 130 using measurements of detection system 110 or verification system 150 as ground control points, or notifying an operator of the farming machine 100.

FIGS. 13A-13F illustrate several example dissimilarities that a control system 130 can determine by comparing a treatment map 510 to an executed treatment map 512. Each executed treatment map 512 in FIGS. 13A-13F are compared to the treatment map 510 of FIG. 7B to determine dissimilarities.

Figure 13A:
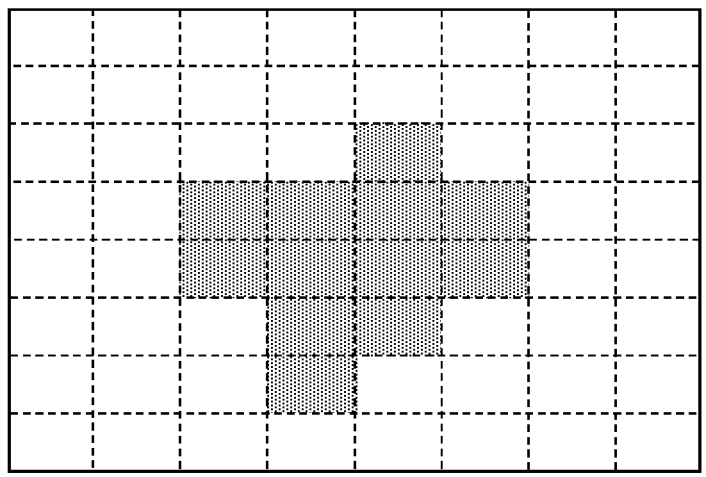
FIGS. 13A-13F illustrate several example dissimilarities that a control system can determine by comparing a treatment map to an executed treatment map, according to some example embodiments.

FIG. 13A is a first example executed treatment map that is dissimilar from a treatment map 510. In this example, the map elements in the fourth column are all shifted down by one map element relative to the treatment map 510 of FIG. 7B. This can indicate that there is a delay in actuating a treatment mechanism corresponding to the map elements of the fourth column as the farming machine travels through the field.

Figure 13B:
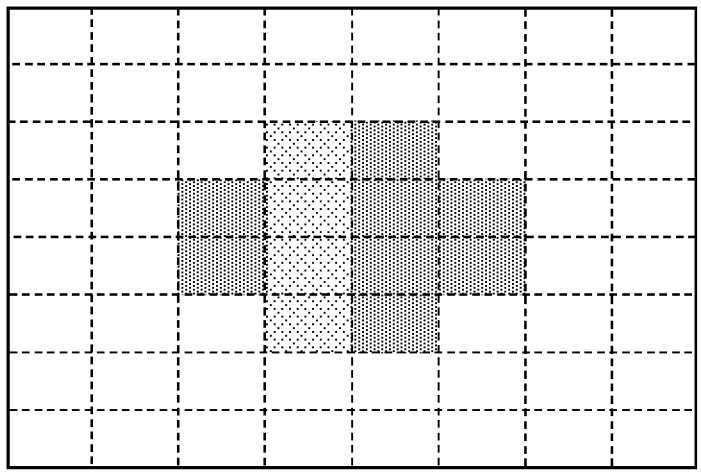

FIG. 13B is a second example executed treatment map 512 that is dissimilar from a treatment map 510. In this example, the model is configured to determine varying degrees of plant treatment and, accordingly, an executed treatment map can indicate varying degrees of plant treatment. For example, the model can identify spray areas that have been heavily sprayed or lightly sprayed. Here, the executed treatment map 512 includes map elements in the fourth column that indicate that the treatment areas 122 corresponding map elements in the fourth column are only lightly sprayed instead of heavily sprayed as in the treatment map of FIG. 7B. Accordingly, this dissimilarity can indicate that the treatment mechanism associated with the fourth column may have a reduced flow rate.

Figure 13C:
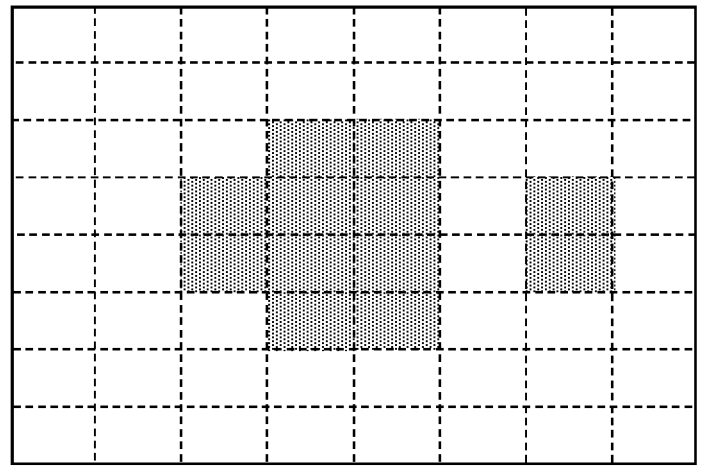

FIG. 13C is a third example executed treatment map 512 that is dissimilar from a treatment map 510. In this example, the map elements in the sixth column are all shifted right by one map element relative to the treatment map 510 of FIG. 7B. This can indicate that there is a misalignment of the treatment mechanism corresponding to the map elements of the sixth column (e.g., a spray nozzle spraying off axis).

Figure 13D:
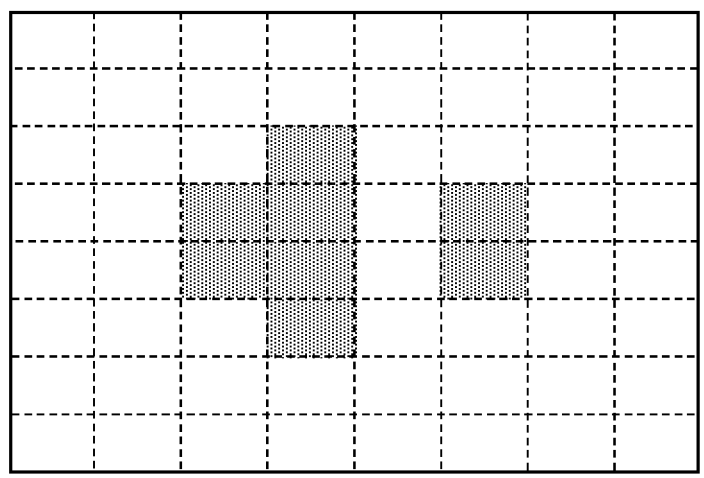

FIG. 13D is a fourth example executed treatment map 512 that is dissimilar from a treatment map 510. In this example, the map elements in the fifth column are missing relative to the treatment map 510 of FIG. 7B. This can indicate that the treatment mechanism corresponding to the map elements of the fifth column is clogged.

Figure 13E:
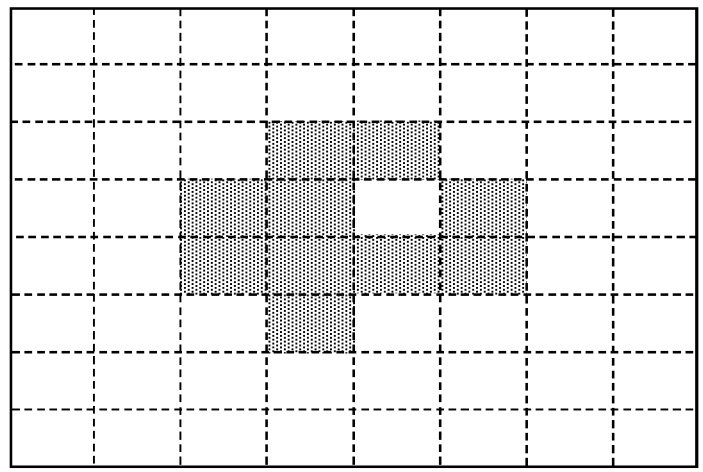

FIG. 13E is a fifth example executed treatment map 512 that is dissimilar from a treatment map 510. In this example, the map some elements in the fifth column are missing relative to the treatment map 510 of FIG. 7B. This can indicate that the treatment mechanism corresponding to the map elements of is intermittently actuating.

Figure 13F:
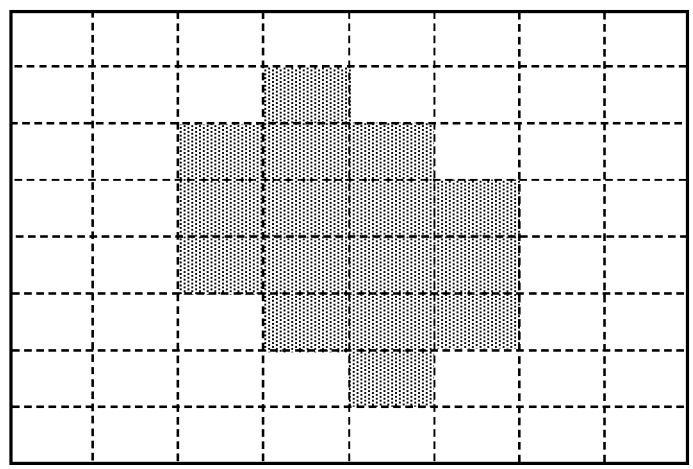

FIG. 13F is a sixth example executed treatment map 512 that is dissimilar from a treatment map 510. In this example, the map some elements are rotated ninety degrees relative to the treatment map 510 of FIG. 7B. This can indicate that the farming machine is travelling in the wrong direction. In various embodiments, the control system can determine any number of other angles of rotation.

The proceeding examples in FIGS. 13A-F are given as means of an example. The control system 130 can determine any other dissimilarity by comparing a treatment map to an executed treatment map. Also, note that the illustrated discrepancies are limited by the size of the treatment areas 122 relative to the size of the treatment maps. Generally, reducing the size of the treatment areas 122 relative to a treatment map increases the capability of the control system to determine discrepancies.

IX. Control System

Figure 14:
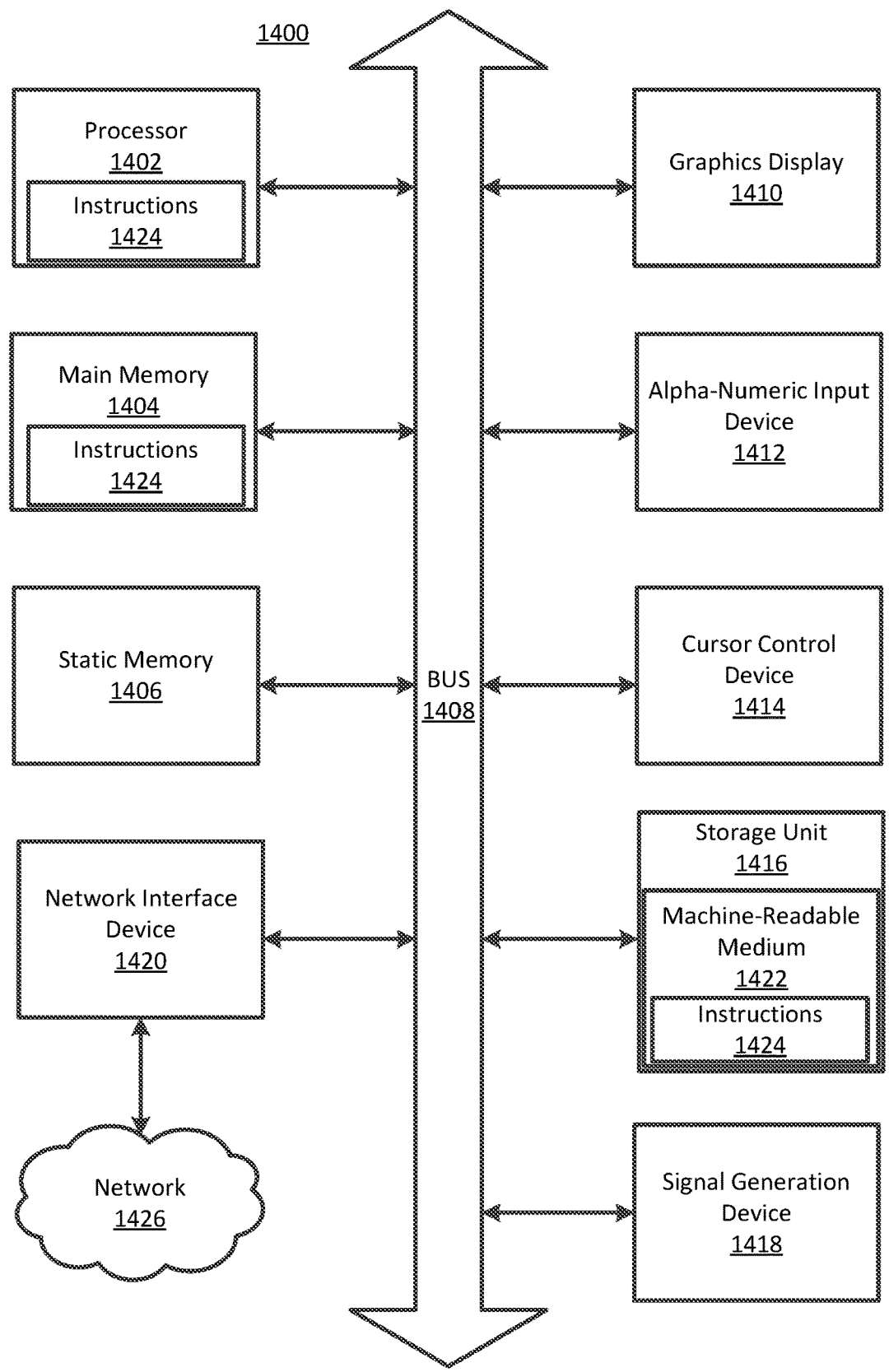
FIG. 14 is a block diagram illustrating components of an example machine for reading and executing instructions from a machine-readable medium, according to one example embodiment.

FIG. 14 is a block diagram illustrating components of an example machine for reading and executing instructions from a machine-readable medium. Specifically, FIG. 14 shows a diagrammatic representation of control system 130 in the example form of a computer system 1400. The computer system 1400 can be used to execute instructions 1424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally processor 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1400 also includes a main memory 1404. The computer system may include a storage unit 1416. The processor 1402, memory 1404, and the storage unit 1416 communicate via a bus 1408.

In addition, the computer system 1406 can include a static memory 1406, a graphics display 1410 (e.g., to drive a plasma display panel (PDP), a liquid crystal display (LCD), or a projector). The computer system 1400 may also include alphanumeric input device 1412 (e.g., a keyboard), a cursor control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. For example, the instructions 1424 may include the functionalities of modules of the system 130 described in FIG. 2. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1426 via the network interface device 1420.

X. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for identifying a plant in a field, the method comprising:
    accessing an image of the field captured by an imaging system, the accessed image having a pixel dimensionality and including a plurality of pixels with a subset of the pixels representing the plant in the field;
    accessing a semantic segmentation model trained to identify plants in images by recognizing pixels in images representing plants, the semantic segmentation model trained with previously captured images comprising green plants and labelled to identify green pixels representing the green plants;
    applying the semantic segmentation model to the image to identify which pixels of the image represent the plant, the semantic segmentation model configured to:
        identify the subset of pixels in the image representing the plant,
        generate a treatment map comprising a plurality of elements, each element of the plurality corresponding to a group of pixels of the plurality of pixels, one or more of the elements corresponding to the subset of pixels representing the plant, and each element indicating a treatment for a portion of the field represented by pixels corresponding to that element, and
        wherein a dimensionality of the plurality of elements in the treatment map is less or equal to the pixel dimensionality.

2. The method of claim 1, further comprising:
    storing the treatment map in a treatment map database accessible by a farming machine.

3. The method of claim 1, further comprising:
    treating the plant in the field according to the treatment map.

4. The method of claim 1, wherein the method is performed by a farming machine, and the farming machine comprises a plurality of treatment mechanisms for treating plants, the plurality of treatment mechanisms having a treatment mechanism dimensionality that is the same as the treatment map dimensionality.

5. The method of claim 1, further comprising:
    for each element in the plant treatment map, generating a plant treatment instruction corresponding to the treatment indicated by the element comprising the subset of pixels identified as representing the plant;
    storing the plant treatment instructions in an instruction database.

6. The method of claim 5, further comprising:
    transmitting the plant treatment instructions to the farming machine, the farming machine comprising a plurality of plant treatment mechanisms configured to actuate the plant treatment mechanisms using the plant treatment instruction to treat the identified plant based on the treatment map.

7. The method of claim 1, wherein the semantic segmentation model further comprises:
    a plurality of neural network layers comprising:
        an input layer comprising a plurality of input nodes, a number of the plurality of input nodes corresponding to the pixel dimensionality,
        an output layer comprising a plurality of output nodes, a number of the plurality of output nodes corresponding to the treatment map dimensionality, and
        one or more intermediate layers comprising a plurality of intermediate nodes, the nodes of the intermediate layers transforming data in the input layer to data in the output layer.

8. The method of claim 1, wherein applying the semantic segmentation model further comprises:
    accessing a treatment array including a plurality of treatment elements, wherein:
        the treatment array has the treatment dimensionality,
        each of the plurality of treatment elements corresponds to an element of the treatment map, and
        each of the plurality of treatment elements corresponds to a treatment area of a plant treatment mechanism of a farming machine.

9. The method of claim 8, further comprising:
    mapping the treatment array to the accessed image such that each element of the treatment array corresponds to a group of pixels in the accessed image representing the treatment area of the corresponding treatment mechanism.

10. The method of claim 9, further comprising:
    mapping the identified plants to elements of the treatment array to generate a treatment map such that each element of the treatment map includes the identified plant when the identified plant is in its corresponding treatment area.

11. The method of claim 1, wherein:
    the treatment dimensionality is a representation of any of the number, size, shape, arrangement, and configuration of the treatments applied by a plurality of plant treatment mechanisms.

12. The method of claim 1, wherein the farming machine is any of a crop sprayer, a tractor, a tiller, or a seeder.

13. The method of claim 1, wherein the treatment is a spray treatment from an array of spray nozzles.

14. The method of claim 13, wherein the spray treatment is water, nutrients, a herbicide, a fungicide, or another pesticide.

15. A non-transitory computer readable storage medium comprising instructions for identifying a plant in a field, the instructions, when executed by one or more processors, causing the one or more processors to:
    access an image of the field captured by an imaging system, the accessed image having a pixel dimensionality and including a plurality of pixels with a subset of the pixels representing the plant in the field;
    access a semantic segmentation model trained to identify plants in images by recognizing pixels in images representing plants, the semantic segmentation model trained with previously captured images comprising green plants and labelled to identify green pixels representing the green plants;
    apply a semantic segmentation model to the image to identify which pixels of the image represent the plant, the semantic segmentation model configured to:
        identify the subset of pixels in the image representing the plant,
        generate a treatment map comprising a plurality of elements, each element of the plurality corresponding to a group of pixels of the plurality of pixels, one or more of the elements corresponding to the subset of pixels representing the plant, and each element indicating a treatment for a portion of the field represented by pixels corresponding to that element, and wherein a dimensionality of the plurality of elements in the treatment map is less or equal to the pixel dimensionality.

16. The non-transitory computer readable storage medium of claim 15, wherein the instructions, when executed, cause the one or more processors to:

store the treatment map in a treatment map database accessible by a farming machine.

17. The non-transitory computer readable storage medium of claim 15, wherein the instructions, when executed, cause the one or more processors to:

treat the plant in the field according to the treatment map, the treatment map executed by a farming machine comprising a plurality of treatment mechanisms configured to receive and execute the treatment map.

18. A farming machine comprising:

a non-transitory computer readable storage medium comprising instructions for identifying a plant in a field, the instructions, when executed by one or more processors, causing the one or more processors to:

access an image of the field captured by an imaging system, the accessed image having a pixel dimensionality and including a plurality of pixels with a subset of the pixels representing the plant in the field;

access a semantic segmentation model trained to identify plants in images by recognizing pixels in images representing plants, the semantic segmentation model trained with previously captured images comprising green plants and labelled to identify green pixels representing the green plants;

apply a semantic segmentation model to the image to identify which pixels of the image represent the plant, the semantic segmentation model configured to:

identify the subset of pixels in the image representing the plant, generate a treatment map comprising a plurality of elements, each element of the plurality corresponding to a group of pixels of the plurality of pixels, one or more of the elements corresponding to the subset of pixels representing the plant, and each element indicating a treatment for a portion of the field represented by pixels corresponding to that element, and wherein a dimensionality of the plurality of elements in the treatment map is less or equal to the pixel dimensionality.

19. The farming machine of claim 18, wherein the instructions, when executed, cause the one or more processors to:

store the treatment map in a treatment map database accessible by a farming machine.

20. The farming machine of claim 18, wherein the instructions, when executed, cause the one or more processors to:

treat the plant in the field according to the treatment map, the treatment map executed by a farming machine comprising a plurality of treatment mechanisms configured to receive and execute the treatment map.

* * * * *